US006852809B2

(12) United States Patent
Takaoki et al.

(10) Patent No.: US 6,852,809 B2
(45) Date of Patent: Feb. 8, 2005

(54) CATALYST COMPONENT FOR ADDITION POLYMERIZATION, CATALYST FOR ADDITION POLYMERIZATION, AND PROCESS FOR PRODUCING ADDITION POLYMER

(75) Inventors: Kazuo Takaoki, Ichihara (JP); Tatsuya Miyatake, Ichihara (JP); Hiroshi Kuribayashi, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 326 days.

(21) Appl. No.: 09/739,802

(22) Filed: Dec. 20, 2000

(65) Prior Publication Data

US 2001/0041775 A1 Nov. 15, 2001

(30) Foreign Application Priority Data

Dec. 27, 1999 (JP) ............................................. 11-370679

(51) Int. Cl.$^7$ ................................................. B01J 31/00
(52) U.S. Cl. .......................... 526/90; 520/152; 520/154; 520/155; 520/167; 520/171; 520/163; 526/113; 526/159; 526/161; 526/172; 526/217
(58) Field of Search ................................. 502/152, 155, 502/158, 163, 166, 167, 171, 154; 526/114, 117, 90, 113, 159, 161, 172, 217

(56) References Cited

U.S. PATENT DOCUMENTS

| | | | |
|---|---|---|---|
| 3,287,334 A | 11/1966 | Kropa et al. ............... | 260/86.7 |
| 4,338,291 A | 7/1982 | Yamada et al. ............. | 423/648 |
| 4,542,199 A | 9/1985 | Kaminsky et al. .......... | 526/160 |
| 5,721,185 A | 2/1998 | LaPointe et al. ............ | 502/117 |
| 6,153,660 A | 11/2000 | Fujimaki et al. ............. | 522/29 |
| 6,207,606 B1 * | 3/2001 | Lue et al. .................... | 502/113 |
| 6,274,684 B1 * | 8/2001 | Loveday et al. ............. | 526/114 |
| 6,310,167 B1 * | 10/2001 | Kanzawa et al. ........... | 526/352 |
| 6,340,730 B1 * | 1/2002 | Murray et al. ............... | 526/114 |
| 6,380,328 B1 * | 4/2002 | McConville et al. ....... | 526/119 |
| 6,552,137 B1 * | 4/2003 | Kao et al. .................... | 526/133 |

FOREIGN PATENT DOCUMENTS

| | | |
|---|---|---|
| EP | 510602 A1 | 10/1992 |
| EP | 520732 A | 12/1992 |
| EP | 683184 A | 11/1995 |
| JP | 1150014 | 2/1999 |
| WO | WO8805793 | 8/1988 |
| WO | WO9734934 A | 9/1997 |

OTHER PUBLICATIONS

Alleman et al, Photodynamic Therapy of Tumours with Hexadecafluoro Zinc Phthalocyanine Fomulated in Peg–Coated Poly (Lactic Acid) Nanoparticles, 1996, Int. J. Cancer, Wiley–Liss, 66, 821–824.*

Manassen et al, A Comparison Between the Chemical and Electrochemical Catalysis by Tetraphenylporphyrin and Phthalocyanine Complexes, 1974, Journal of Catalysis, Academic Press, 33, 133–137.*

Long, G. S. et al., Polymer Reprints, vol. 40, No. 2, Aug. 2, 1999, pp. 843–844 (XP000994565).

Smirnov, B. R. et al., Polymer Science USSR, vol. 23, No. 11, 1981, pp. 2807–2816, (XP002166944).

Inaki, Y. et al., Journal of Polymer Science, Polymer Chemistry Edition, vol. 16, No. 2, 1978, pp. 399–406, (XP000993580).

Sugimoto, H. et al., Macromolecules, US, American Chemical Society. Easton, vol. 29, No. 10, May 6, 1996, pp. 3359–3369, (XP000583943) ISSN: 0014–3057.

Martchenko, A. et al., European Polymer Journal, GB, Pergamon Press, Ltd. Oxford, vol. 33, No. 5, May 1, 1997, pp. 713–718, (XP004087455).

Inoue, S. et al., Polymeric Materials Science and Engineering, vol. 64, 1991, pp. 10–11 (XP001003013).

Angew. Chem. Int. Ed., 1999, 38, pp. 428–447; George J. P. Britovsek et al; "In Search for New–Generation Olefin Polymerization Catalysts: Life beyoned Metallocens".

Ilan et al., "Dehydrogenation reactions, catalyzed by metallophtalocyanines. Change of mechanism, caused by electron attracting substituents on the catalyst", Proceedings International Congress on Catalysis, vol. 2, pp. 1149–1158, (1973).

Zagal et al., "Paradoxical effect of the redox potential of absorbed metallophthalocyanines on their activity of the oxidation of 2–mercaptoethanol. Inner versus outer sphere electrocatalysis", Electrochemistry Communication, vol. 1, No. 9, pp. 389–393, (1999).

* cited by examiner

Primary Examiner—Stuart L. Hendrickson
Assistant Examiner—Peter J Lish
(74) Attorney, Agent, or Firm—Birch, Stewart, Kolasch & Birch, LLP

(57) ABSTRACT

A catalyst component for addition polymerization containing (A) a compound containing an atom of the Group II to the Group XII or Lanthanide series in which the lowest energy level of unoccupied molecular orbital having the valence p-type atomic orbital of the atom of the Group II to the Group XII or Lanthanide series as a main component, wherein the coefficient represented by a linear combination, is 0.4 or more) is calculated to be 0.008 atomic unit (Hartree) or less by the calculation of density functional method (B3LYP/3-21G level), a catalyst for addition polymerization containing the same, and a process for producing an addition polymer with the catalyst.

18 Claims, No Drawings

CATALYST COMPONENT FOR ADDITION POLYMERIZATION, CATALYST FOR ADDITION POLYMERIZATION, AND PROCESS FOR PRODUCING ADDITION POLYMER

BACKGROUND OF THE INVENTION

1. Field of the Invention

The present invention relates to a catalyst component for addition polymerization, a catalyst for addition polymerization prepared by using the same, and a process for producing an addition polymer.

2. Description of Related Art

Since olefin polymers such as polypropylene and polyethylene are excellent in mechanical properties, chemical resistance and the like and relatively low cost in view of those properties, they have been widely used for various molding fields. These olefin polymers have been produced by polymerizing an olefin using a conventional solid catalyst (multi-site catalyst) which is obtained by combining a solid catalyst component obtained by using a metal compound of the Group IV such as titanium trichloride, titanium tetrachloride or the like, with a metal compound of the Group XIII represented by an organoaluminum compound.

A process for producing an addition polymer, which polymerizes an addition-polymerizable monomer using a so-called single site catalyst combining a transition metal compound which is different from a solid catalyst component having been used from old (for example, a metallocene complex) with an aluminoxane and the like, is recently proposed. For example, a process using bis(cyclopentadienyl) zirconium dichloride and methyl aluminoxane is reported in JP-A-58-19309. Further, it is reported that a specific boron compound and such transition metal compound are combined. For example, a process using bis(cyclopentadienyl) zirconium dimethyl and tri(n-butyl) ammonium tetrakis(pentafluorophenyl) borate is reported in JP-A-01-502036. The olefin polymer obtained by using such single site catalyst has a narrower molecular weight distribution than that obtained by a conventional solid catalyst (multi-site catalyst), and further, a comonomer is more homogeneously copolymerized in case of a copolymer. Accordingly, it is known that a more homogeneous copolymer than a case of using the conventional solid catalyst is obtained.

The improvement of such catalyst component for addition polymerization has been intensively studied, and the kinds of metals used for main catalyst component are widely reported over the respective Groups of the Periodic Table. For example, in Angew. Chem. Int. Ed. 38 428 (1999), it reported that a metallocene complex and non-metallocene compound of the Group III or Group XIII are effective as the main catalyst component. On the other hand, as a co-catalyst component for activation of combining the metallocene complex or non-metallocene compound, an aluminoxane belonging to a compound of the Group XIII, a boron compound and the like are mainly studied.

Further, it is also carried out that a preferable Lewis acid catalyst component is prescribed according to the value of exothermic energy calculated by quantum chemistry calculation, but a component which contains an atom of the Groups II to XII is not disclosed (JP-A-05-194641).

SUMMARY OF THE INVENTION

An object of the present invention is to provide a catalyst component for addition polymerization consisting of a compound containing no element of the Group XIII, which can form a catalyst for addition polymerization revealing a high polymerization activity by being used as a co-catalyst component for activation, a catalyst for addition polymerization prepared by using said catalyst component, which reveals a high polymerization activity, and a process for producing an addition polymer with said catalyst.

The present invention relates to a catalyst component for addition polymerization composed of a compound of a high Lewis acidity, containing an atom of the Groups II to XII or Lanthanide series of the Periodic Table of the Elements (herein-after, "of the Periodic Table of the Elements" is sometimes omitted), and the compound is selected from compounds satisfying a level of a value obtained by quantum chemical calculation, as the Lewis acidity.

Namely, the compound (A) is a compound containing an atom of the Group II to the Group XII or Lanthanide series in which the lowest energy level of the unoccupied molecular orbital having the valence p-type atomic orbital of the atom of the Group II to the Group XII as a main component (coefficient represented by linear combination is 0.4 or more) is calculated to be 0.008 atomic unit (Hartree) or less by the calculation of density functional method (B3LYP/3-21G level).

Further, the present invention relates to a catalyst for addition polymerization obtained by contacting the catalyst component with a specific metal compound (B), and a process for producing an addition polymer with the catalyst for addition polymerization.

Further, the present invention is illustrated in detail below.

DETAILED DESCRIPTION OF THE INVENTION

The catalyst component for addition polymerization of the present invention is a compound containing an atom of the Group II to the Group XII or Lanthanide series in which the lowest energy level of the unoccupied molecular orbital having the valence p-type atomic orbital of the atom of the Group II to the Group XII as a main component (coefficient represented by a linear combination is 0.4 or more) is calculated to be 0.008 atomic unit (Hartree) or less by the calculation of density functional method (B3LYP/3-21G level).

The calculation of the density functional method can be calculated by a known method, for example, a high speed computer such as SP2 of IBM Co., Ltd. or the like using a Gaussian 94 program of Gaussian Inc., Ltd. Its calculation level can be selected in accordance with a model to be calculated and the ability of the high speed computer. Further, concerning the combination of basis functions representing atomic orbitals of respective atoms, many basis sets are stored in the Gaussian 94 program, and these can be also suitably selected in accordance with a model to be calculated and the ability of the high speed computer. Particularly, a plurality of basis functions are often used for atomic orbitals suitable for representing a valence electron orbital and a polarized condition. Moreover, concerning structure parameters input during calculation, experimental data and coordinates obtained from another theoretical chemistry method can be input, and they can be also determined from the calculation of structural optimization by the above-mentioned program. Herein, the other theoretical chemistry method includes not only a quantum chemistry procedure, but also a molecular mechanics procedure. The calculation of the molecular mechanics procedure is possible using a CAChe system of Fujitsu Co., Ltd. or the like.

The catalyst component for addition polymerization of the present invention is composed of a compound (A) of a high Lewis acidity, containing an atom of the Group II to XII or Lanthanide series, and the compound (A) is selected from compounds satisfying the energy level of the unoccupied molecular orbital obtained by a quantum chemistry calculation as described above, as the Lewis acidity.

The central metal atom in the compound (A) is an atom of the Group II to the Group XII or Lanthanide series of the Periodic Table of the Elements (Revised edition of IUPAC Inorganic Chemistry Nomenclature 1989). Specific examples of the central metal atom include a scandium atom, an yttrium atom, a titanium atom, a zirconium atom, a vanadium atom, a chromium atom, a molybdenum atom, a manganese atom, a rhenium atom, an iron atom, a ruthenium atom, a cobalt atom, a rhodium atom, a nickel atom, a palladium atom, a platinum atom, a copper atom, a silver atom, a gold atom, a zinc atom, a cadmium atom, a mercury atom, a samarium atom, an ytterbium atom and the like. As the central metal atom, an atom of the Group IX or Group XII is preferable, and a cobalt atom or a zinc atom is preferable in particular.

And, as a group to which the central atom bonds, there are illustrated a halogen atom, halogenated hydrocarbon groups having 1 to 20 carbon atoms, halogenated alkoxy groups having 1 to 20 carbon atoms, a halogenated aryloxy groups having 6 to 20 carbon atoms, oxygen-containing oligomers, and atomic groups having a porphyrin or phthalocyanine skeleton.

Specific examples of the halogen atom include fluorine, chlorine, bromine and iodine, preferably fluorine and chlorine.

Specific example of the halogenated hydrocarbon groups having 1 to 20 carbon atoms include a trifluoromethyl group, a pentafluoroethyl group, a heptafluoroisopropyl group, a hexafluoriisopropyl group, and perfluoro-t-butyl group.

Specific example of the halogenated alkoxy groups having 1 to 20 carbon atoms include a trifluoromethoxy group, a pentafluoroethoxy group, a heptafluoroisopropoxy group, a hexafluoroisopropoxy group and a perfluoro-t-butoxy group.

Specific example of the halogenated aryloxy groups having 1 to 20 carbon atoms include a monofluorophenoxy group, a difluorophenoxy group, a trifluorophenoxy group, a tetrafluorophenoxy group, a pentafluorophenoxy group and a trifluoromethylphenoxy group, and preferably a pentafluorophenoxy group.

As the oligomer containing an oxygen atom, oxides of an atom of the Groups 2 to 12 and Lanthanide series represented by the general formula below:

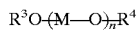

(wherein M is an atom of the Groups II to XII and Lanthanide series of the Periodic Table of the Element, and respective $R^3$ and $R^4$ represent independently a hydrocarbon group having 1 to 20 carbon atoms may be substituted with a halogen atom.). The specific example of M is selected from the specific examples of atoms of the Groups II to XII and Lanthanide series described above, and specific examples of $R^3$ and $R^4$ are also selected from, for example, the specific examples of the halogenated hydrocarbon having 1 to 20 carbon atoms as described above. The oligomer containing an oxygen atom is preferably zincoxane.

As the compound (A) having a porphyrin skeleton or phthalocyanine skeleton, a compound represented by the general formula [1] described below is preferable:

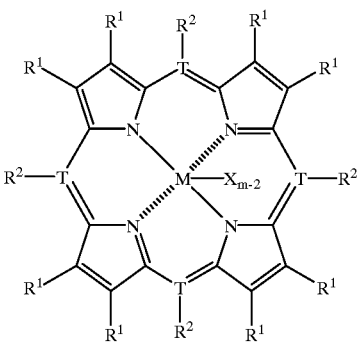

[1]

(wherein M represents an atom of the Group II to the Group XII or Lanthanide series of the Periodic Table; T represents an atom of the Group XIV or Group XV of the Periodic Table; all of T's may be mutually the same or different; Each of $R^1$ and $R^2$ independently is a hydrogen atom, a halogen atom, a hydrocarbon group or a halogenated hydrocarbon group; all of $R^1$'s and all of $R^2$'s may be mutually the same or different, respectively and may mutually form a ring; X represents a hydrogen atom, a halogen atom, a hydrocarbon group or a hydrocarbon oxy group; when a plural number of X's exist, they may be mutually the same or different; and m represents a valence of M.) and satisfying that the lowest energy level of the unoccupied molecular orbital having the valence p-type atomic orbital of the atom as the main component is calculated to be 0.008 atomic unit or less as mentioned above.

M includes the atoms as exemplified above and a cobalt atom or a zinc atom is particularly preferable.

"m" represents the valence of M, and when M is a cobalt atom, 2 or 3 is preferable, and when M is a zinc atom, m is preferably 2.

T in the general formula [1] represents an atom of the Group XIV or Group XV of the Periodic Table of the Elements (Revised edition of IUPAC Inorganic Chemistry Nomenclature 1989), and all of T's may be mutually the same or different. Specific examples of the atom of the Group XIV include a carbon atom, silicon atom and the like, and specific examples of the atom of the Group XV include a nitrogen atom, phosphorous atom and the like. T is preferably a carbon atom or nitrogen atom, and more preferably a nitrogen atom.

Each of $R^1$ and $R^2$ in the general formula [1] independently is a hydrogen atom, a halogen atom, a hydrocarbon group or a halogenated hydrocarbon group, all of $R^1$'s and all of $R^2$'s may be mutually the same or different, respectively and may mutually form a ring, respectively. At least one of $R^1$ and $R^2$ is preferably an electron-withdrawing group, and as the electron-withdrawing group, a halogen atom or a halogenated hydrocarbon group is preferable.

Specific examples of the halogen atom include a fluorine atom, a chlorine atom, a bromine atom and an iodine atom. A fluorine atom is preferable.

As a hydrocarbon group, an alkyl group, an aryl group or an aralkyl group is preferable.

As the alkyl group, an alkyl group having 1 to 20 carbon atoms is preferable. Examples thereof include a methyl group, an ethyl group, a n-propyl group, an isopropyl group, a n-butyl group, a sec-butyl group, a tert-butyl group, an isobutyl group, a n-pentyl group, a neopentyl group, a n-hexyl group, a n-octyl group, a n-decyl group, a n-dodecyl group, a n-pentadecyl group, a n-eicosyl group and the like. A methyl group, an ethyl group, an isopropyl group, a tert-butyl group and an isobutyl group are preferable.

As the aryl group, an aryl group having 6 to 20 carbon atoms is preferable. Examples thereof include a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group, an anthracenyl group and the like, and a phenyl group is more preferable.

As the aralkyl group, an aralkyl group having 7 to 20 carbon atoms is preferable. Examples thereof include a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, (3,5-dimethylphenyl)methyl group, a (2,3,4-timethylphenyl)methyl group, a (2,3,5-timethylphenyl)methyl group, a (2,3,6-timethylphenyl) methyl group, a (3,4,5-timethylphenyl)methyl group, a (2,4,6-timethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl) methyl group, an (ethylphenyl)methyl group, a (n-propylphenyl)methyl group, an (isopropylphenyl)methyl group, a (n-butylphenyl)methyl group, a (sec-butylphenyl) methyl group, a (tert-butylphenyl)methyl group, a (n-pentylphenyl)methyl group, a (neopentylphenyl)methyl group, a (n-hexylphenyl)methyl group, a (n-octylphenyl) methyl group, a (n-decylphenyl)methyl group, a (n-dodecylphenyl)methyl group, a (n-tetradecylphenyl) methyl group, a naphthylmethyl group, an anthracenylmethyl group and the like, and a benzyl group is more preferable.

Further, as the halogenated hydrocarbon group, a halogenated alkyl group, a halogenated aryl group, or a (halogenated alkyl)aryl group is preferable.

As the halogenated alkyl group, a halogenated alkyl group having 1 to 20 carbon atoms is preferable. Examples thereof include a fluoromethyl group, a chloromethyl group, a bromomethyl group, an iodomethyl group, a difluoromethyl group, a dichloromethyl group, a dibromomethyl group, a diiodomethyl group, a trifluoromethyl group, a trichloromethyl group, a tribromomethyl group, a triiodomethyl group, a 2,2,2-trifluoroethyl group, a 2,2,2-trichloroethyl group, a 2,2,2-tribromoethyl group, a 2,2,2-triiodoethyl group, a 2,2,2,3,3,3-pentafluoropropyl group, a 2,2,3,3,3-pentachloropropyl group, a 2,2,3,3,3-pentabromopropyl group, a 2,2,3,3,3-pentaiodopropyl group, a 2,2,2-trifluoro-1-trifluoromethylethyl group, a 2,2,2-trichloro-1-trichloromethylethyl group, a 2,2,2-tribromo-1-tribromomethylethyl group, a 2,2,2-triiodo-1-tribodomethylethyl group, a 1,1-bis(trifluoromethyl)-2,2,2-trifluoroethyl group, a 1,1-bis(trichloromethyl)-2,2,2-trichloroethyl group, a 1,1-bis(tribromomethyl)-2,2,2-tribromoethyl group, a 1,1-bis(triiodomethyl)-2,2,2-triiodoethyl group, and the like.

As the halogenated aryl group, a halogenated aryl group having 6 to 20 carbon atoms is preferable.

Examples thereof include a 2-fluorophenyl group, a 3-fluorophenyl group, a 4-fluorophenyl group, a 2-chlorophenyl group, a 3-chlorophenyl group, a 4-chlorophenyl group, a 2-bromophenyl group, a 3-bromophenyl group, a 4-bromophenyl group, a 2-iodophenyl group, a 3-iodophenyl group, a 4-iodophenyl group, a 2,6-difluorophenyl group, a 3,5-difluorophenyl group, a 2,6-dichlorophenyl group, a 3,5-dichlorophenyl group, a 2,6-dibromophenyl group, a 3,5-dibromophenyl group, a 2,6-diiodophenyl group, a 3,5-diiodophenyl group, a 2,4,6-trifluorophenyl group, a 2,4,6-trichlorophenyl group, a 2,4,6-tribromophenyl group, a 2,4,6-triiodophenyl group, a pentafluorophenyl group, a pentachlorophenyl group, a pentabromophenyl group, a penta-iodophenyl group, and the like.

As the (halogenated alkyl)aryl group, a (halogenated alkyl)aryl group having 7 to 20 carbon atoms is preferable. Examples thereof include a 2-(trifluoromethyl)phenyl group, a 3-(trifluoromethyl)phenyl group, a 4-(trifluoromethyl)phenyl group, a 2,6-bis(trifluoromethyl) phenyl group, a 3,5-bis(trifluoromethyl)phenyl group, a 2,4,6-tris(trifluoromethyl)phenyl group, and the like.

X in the general formula [1] represents a hydrogen atom, a halogen atom, a hydrocarbon group or a hydrocarbon oxy group, and when a plural number of X's exist, they may be mutually the same or different. Specific examples of the halogen atom include a fluorine atom, a chlorine atom, a bromine atom and an iodine atom, and a chlorine atom is preferable. Further, as the hydrocarbon group, an alkyl group, an aryl group, or an aralkyl group is preferable.

As the alkyl group, an alkyl group having 1 to 20 carbon atoms is preferable. Examples thereof include a methyl group, an ethyl group, a n-propyl group, an isopropyl group, a n-butyl group, a sec-butyl group, a tert-butyl group, an isobutyl group, a n-pentyl group, a neopentyl group, a n-hexyl group, a n-octyl group, a n-decyl group, a n-dodecyl group, a n-pentadecyl group, a n-eicosyl group, and the like. A methyl group, an ethyl group, an isopropyl group, a tert-butyl group or an isobutyl group is preferable.

As the aryl group, an aryl group having 6 to 20 carbon atoms is preferable. Examples thereof include a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group, an anthracenyl group and the like, and a phenyl group is more preferable.

As the aralkyl group, an aralkyl group having 7 to 20 carbon atoms is preferable. Examples thereof include a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl) methyl group, a (2,6-dimethylphenyl)methyl group, a (3,4-dimethylphenyl)methyl group, (3,5-dimethylphenyl)methyl group, a (2,3,4-timethylphenyl)methyl group, a (2,3,5-timethylphenyl)methyl group, a (2,3,6-timethylphenyl) methyl group, a (3,4,5-timethylphenyl)methyl group, a (2,4,6-timethylphenyl)methyl group, a (2,3,4,5- tetramethylphenyl)methyl group, a (2,3,4,6-tetramethylphenyl)methyl group, a (2,3,5,6-tetramethylphenyl)methyl group, a (pentamethylphenyl)methyl group, an (ethylphenyl)methyl group, a (n-propylphenyl)methyl group, an (isopropylphenyl)methyl group, a (n-butylphenyl)methyl group, a (sec-butylphenyl)methyl group, a (tert-butylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a (n-dodecylphenyl)methyl group, a (n-tetradecylphenyl)methyl group, a naphthylmethyl group, an anthracenylmethyl group and the like, and a benzyl group is more preferable.

As the hydrocarbon oxy group in X of the general formula [1], an alkoxy group, an aryloxy group or an aralkyloxy group is preferable.

As the alkoxy group herein, an alkoxy group having 1 to 24 carbon atoms is preferable. Examples thereof include a methoxy group, an ethoxy group, a n-propoxy group, an isopropoxy group, a n-butoxy group, a sec-butoxy group, a tert-butoxy group, a n-pentoxy group, a neopentoxy group, a n-hexoxy group, a n-octoxy group, a n-dodecoxy group, a n-pentadecoxy group, a n-icosoxy group, and the like, and a methoxy group, an ethoxy group or a tert-butoxy group is preferable.

Further, as the aryloxy group, an aryloxy group having 6 to 24 carbon atoms is preferable. Examples thereof include a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2,3,4-trimethylphenoxy group, a 2,3,5-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 3,4,5-trimethylphenoxy group, a 2,3,4,5-tetramethylphenoxy group, a 2,3,4,6-tetramethylphenoxy group, a 2,3,5,6-tetramethylphenoxy group, a pentamethylphenoxy group, or a ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphtoxy group, an antharcenoxy group and the like.

As the aralkyloxy group, an aralkyloxy group having 7 to 24 carbon atoms is preferable. Examples thereof include a benzyloxy group, a (2-methylphenyl)methoxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5 -trimethylphenyl)methoxy group, a (2,4,6 -trimethylphenyl)methoxy group, a (3,4,5 -trimethylphenyl)methoxy group, a (2,3,4,5-tetramethylphenyl)methoxy group, a (2,3,5,6-tetramethylphenyl)methoxy group, a (pentamethylphenyl)methoxy group, or a (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a n-tetradecylphenyl) methoxy group, a naphtylmethoxy group, an antharcenylmethoxy group and the like, and a benzyloxy group is preferable.

Specific examples of the compound represented by the general formula [1] are illustrated below, but they are not limited thereto. In the specific examples mentioned below, M represents an atom of the Group II to the Group XII of the Periodic Table or Lanthanide series (proviso that Cu is excluded in (A3)), X represents a hydrogen atom, a halogen atom, a hydrocarbon group or a hydrocarbon oxy group, and m represents an atomic valence of M.

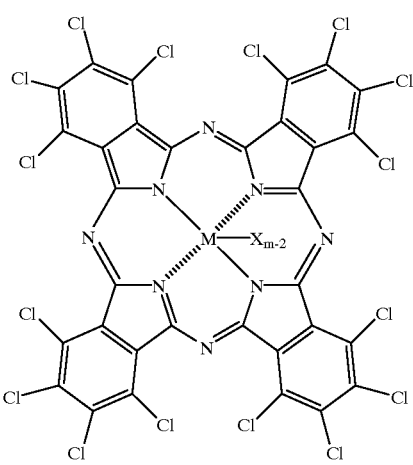

(A1)

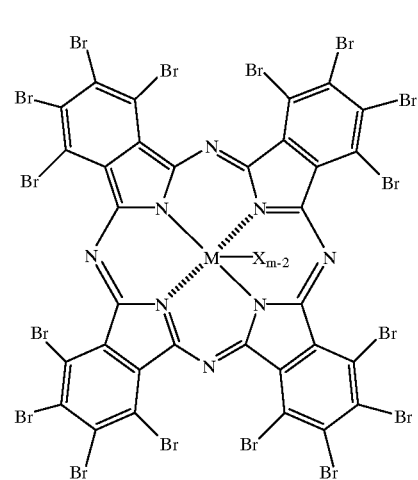

(A2)

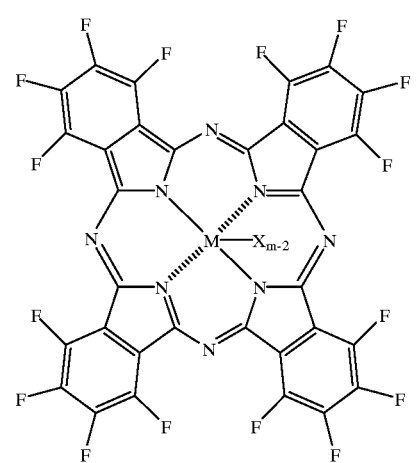

(A3)

-continued (A4)

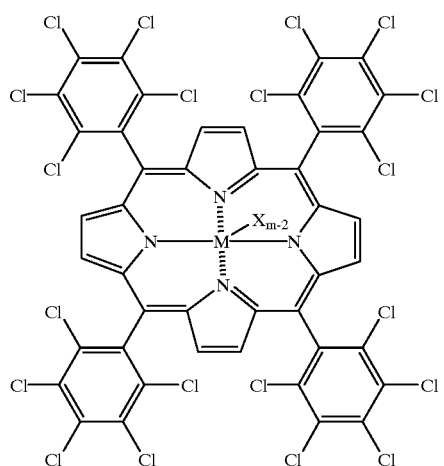

(A5)

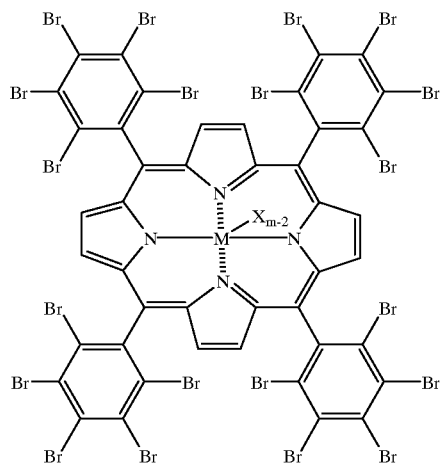

(A6)

[2]

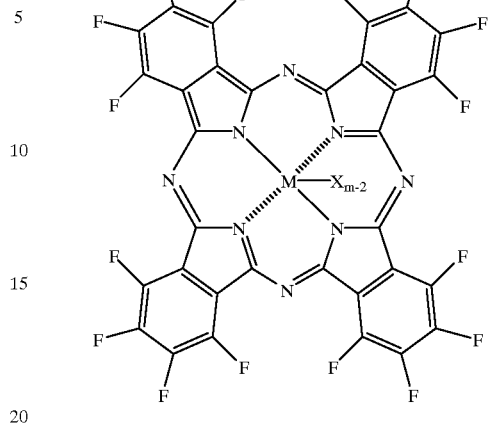

(wherein M represents an atom of the Group II to the Group XII excluding Cu, or Lanthanide series of the Periodic Table, X represents a hydrogen atom, a halogen atom, a hydrocarbon group or a hydrocarbon oxy group, and when a plural number of X's exist, they may be mutually the same or different. m represents a valence of M.)

Further, M, X and m in the general formula [2] are the same as in the general formula [1].

The compound represented by the general formula [1] can be synthesized by known methods. For example, a method described in "Inorganic Chemistry, 19, 3131–3135 (1980)" is mentioned. Further, these compounds are commercially available, and a purchased product can be used as it is.

The catalyst component for addition polymerization of the present invention as described in detail above is suitably used as a catalyst component for olefin polymerization. Specific examples of the catalyst for addition polymerization of the present invention include a catalyst for addition polymerization obtained by contacting the above-mentioned catalyst component for addition polymerization of the present invention (A) and the metal compound of the Group III to the Group XIII or Lanthanide series (B), and a catalyst for addition polymerization obtained by contacting the above-mentioned catalyst component for addition polymerization of the present invention (A), the metal compound of the Group III to the Group XIII or Lanthanide series (B), and the organoaluminum compound (C).

The catalyst component for addition polymerization is further illustrated in detail below. (B) Metal compound of the Group III to the Group XIII or Lanthanide series As the metal compound (B) of the Group III to the Group XIII or Lanthanide series used for the catalyst for addition polymerization of the present invention, a metal compound of the Group III to the Group XIII or Lanthanide series, which reveals addition polymerization activity by using a compound different from the above-mentioned catalyst component for addition polymerization of the present invention (A) and using the catalyst component for addition polymerization (A) (or further, the organoaluminum compound (C)) as a catalyst component for activation, is not particularly limited. As such metal compound (B), for example, a metal compound represented by the general Among compounds represented by the general formula [1], a compound represented by the general formula [2] described below is more preferable:

formula [4] described below, a metal compound of μ-oxo-type thereof, and the like are mentioned.

$$L_aM^1X_b \quad [4]$$

(wherein $M^1$ is a metal atom of the Group III to the Group XIII or Lanthanide series. L is a group having cyclopentadienyl type anion skeleton or a group containing a hetero atom, a plurality of L's may be linked directly, or through a residual group containing a carbon atom, a silicon atom, a nitrogen atom, an oxygen atom, a sulfur atom or a phosphorous atom. X is a halogen atom or a hydrocarbon group. "a" represents a number satisfying $0<a\leqq 8$, and "b" represents a number satisfying $0<b\leqq 8$.)

In the general formula [4], $M^1$ is a metal atom of the Group III to the Group XIII or Lanthanide series of the Periodic Table of the Elements (IUPAC 1989). Specific examples thereof include a scandium atom, an yttrium atom, a titanium atom, a zirconium atom, a hafnium atom, a vanadium atom, a niobium atom, a tantalum atom, a chromium atom, an iron atom, a ruthenium atom, a cobalt atom, a rhodium atom, a nickel atom, a palladium atom, a samarium atom, an ytterbium atom, an aluminum atom, a boron atom and the like. As M in the general formula [4], a transition metal atom is preferable, and a titanium atom, a zirconium atom or a hafnium atom is preferable in particular.

In the general formula [4], L is a group having a cyclopentadiene type anion skeleton or a group containing a heteroatom, and a plurality of L's may be the same or different. Further, a plurality of L's may be linked directly, or through a residual group containing a carbon atom, a silicon atom, a nitrogen atom, an oxygen atom, a sulfur atom or a phosphorous atom.

As the group having a cyclopentadiene type anion skeleton in L, a cyclopentadienyl group, a (substituted) cyclopentadienyl group, an indenyl group, a (substituted) indenyl group, a fluorenyl group, a (substituted)fluorenyl group and the like are mentioned. Examples of the group having a cyclopentadiene type anion skeleton include an $\eta^5$-(substituted)cyclopentadienyl group, an $\eta^5$-(substituted) indenyl group, an $\eta^5$-(substituted)fluorenyl group and the like. Specific examples thereof include an $\eta^5$-cyclopentadienyl group, an $\eta^5$-methylcyclopentadienyl group, an $\eta^5$-tert-butylcyclopentadienyl group, an $\eta^5$-1,2-dimethylcyclopentadienyl group, an $\eta^5$-1,3-dimethylcyclopentadienyl group, an $\eta^5$-1-tert-butyl-2-methylcyclopentadienyl group, an $\eta^5$-1-tert-butyl-3-methylcyclopentadienyl group, an $\eta^5$-1-methyl-2-isopropylcyclopentadienyl group, an $\eta^5$-1-methyl-3-isopropylcyclopentadienyl group, an $\eta^5$-1,2,3-trimethylcyclopentadienyl group, an $\eta^5$-1,2,4-trimethylcyclopentadienyl group, an $\eta^5$-tetramethylcyclopentadienyl group, an $\eta^5$-pentamethylcyclopentadienyl group, an $\eta^5$-indenyl group, an $\eta^5$-4,5,6,7-tetrahydroindenyl group, an $\eta^5$-2-methylindenyl group, an $\eta^5$-3-methylindenyl group, an $\eta^5$-4-methylindenyl group, an $\eta^5$-5-methylindenyl group, an $\eta^5$-6-methylindenyl group, an $\eta^5$-7-methylindenyl group, an $\eta^5$-2-tert-butylindenyl group, an $\eta^5$-3-tert-butylindenyl group, an $\eta^5$-4-tert-butylindenyl group, an $\eta^5$-5-tert-butylindenyl group, an $\eta^5$-6-tert-butylindenyl group, an $\eta^5$-7-tert-butylindenyl group, an $\eta^5$-2,3-dimethylindenyl group, an $\eta^5$-4,7-dimethylindenyl group, an $\eta^5$-2,4,7-trimethylindenyl group, an $\eta^5$-2-methyl-4-isopropylindenyl group, an $\eta^5$-4,5-dibenzindenyl group, an $\eta^5$-4,5-dibenzindenyl group, an $\eta^5$-4-phenylindenyl group, an $\eta^5$-2-methyl-5-phenylindenyl group, an $\eta^5$-2-methyl-4-phenylindenyl group, an $\eta^5$-2-methyl-4-naphthylindenyl group, an $\eta^5$-fluorenyl group, an $\eta^5$-2,7-dimethylfluorenyl group, an $\eta^5$-2,7-di-tret-butylfluorenyl group, and substitution products thereof, etc.

As the hetero atom in a group containing the fore-mentioned hetero atom, an oxygen atom, a sulfur atom, a nitrogen atom, a phosphorous atom and the like are mentioned, and examples thereof include an alkoxy group, an aryloxy group, a thioalkoxy group, a thioaryloxy group, an alkylamino group, an arylamino group, an alkylphosphino group, an arylphosphino group, or an aromatic group or an aliphatic hetero cyclic group having an oxygen atom, a sulfur atom, a nitrogen atom and/or a phosphorous atom in the ring, a chelating ligand and the like.

When the group containing a hetero atom is specifically exemplified, a methoxy group, an ethoxy group, a propoxy group, a butoxy group, a phenoxy group, a 2-methylphenoxy group, a 2,6-dimethylphenoxy group, a 2,4,6-trimethylphenoxy group, a 2-ethylphenoxy group, a 4-n-propylphenoxy group, a 2-isopropylphenoxy group, a 2,6-diisopropylphenoxy group, a 4-sec-butylphenoxy group, a 4-tert-butylphenoxy group, a 2,6-di-sec-butylphenoxy group, a 2-tert-butyl-4-methylphenoxy group, 2,6-di-tert-butylphenoxy group, 4-methoxyphenoxy group, a 2,6-dimethoxyphenoxy group, a 3,5-dimethoxyphenoxy group, a 2-chlorophenoxy group, a 4-nitrosophenoxy group, a 4-nitrophenoxy group, a 2-aminophenoxy group, a 3-aminophenoxy group, a 4-aminothiophenoxy group, a 2,3,6-trichlorophenoxy group, a 2,4,6-trifluorophenoxy group, a thiomethoxy group, a dimethylamino group, a diethylamino group, a dipropylamino group, a diphenylamino group, an isopropylamino group, a tert-butylamino group, a pyrrolyl group, a dimethylphosphino group, a 2-(2-oxy-1-propyl)phenoxy group, cathecol, resorsinol, 4-isopropylcathecol, 3-methoxycathecol, a 1,8-dihydroxynaphthyl group, a 1,2-dihydroxynaphthyl group, a 2,2'-biphenyldiol group, a 1,1'-bi-2-naphthol group, a 2,2'-dihydroxy-6,6'-dimethylbiphenyl group, a 4,4', 6,6'-tetra-tert-butyl-2,2'-methylenediphenoxy group, a 4,4', 6,6'-tetramethyl-2,2'-isobutylidenediphenoxy group and the like can be exemplified.

Further, as the group containing the fore-mentioned heteroatom, a group represented by the general formula [5] can be also exemplified.

$$R_3P=N— \quad [5]$$

(wherein each of R's represents a hydrogen atom, a halogen atom, a hydrocarbon group, they may be mutually the same or different, and two or more of them may be mutually bonded and may mutually form a ring.)

Specific examples of R in the general formula [5] include a hydrogen atom, a fluorine atom, a chlorine atom, a bromine atom, an iodine atom, a methyl group, an ethyl group, a n-propyl group, an isopropyl group, a n-butyl group, a tert-butyl group, a cyclopropyl group, a cyclobutyl group, a cycloheptyl group, a cyclohexyl group, a phenyl group, a 1-naphthyl group, a 2-naphthyl group, a benzyl group and the like, but are not limited to these.

Moreover, as the group containing the fore-mentioned heteroatom, a group represented by the general formula [6] can be also exemplified.

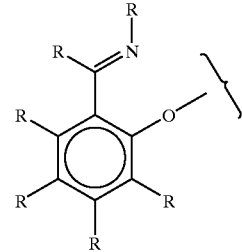

[6]

(wherein each of R's represents a hydrogen atom, a halogen atom, a hydrocarbon group, a hydrocarbon oxy group, a silyl group, an amino group, they may be mutually the same or different, and two or more of them may be mutually bonded and may mutually form a ring.)

Specific examples of R in the above-mentioned general formula [6] include a hydrogen atom, a fluorine atom, a chlorine atom, a bromine atom, an iodine atom, a phenyl group, a 1-naphthyl group, a 2-naphthyl group, a tert-butyl group, a 2,6-dimethylphenyl group, a 2-fluorenyl group, a 2-methylphenyl group, a 4-trifluoromethylphenyl group, a 4-methoxyphenyl group, a 4-piridyl group, a cyclohexyl group, a 2-isopropylphenyl group, a benzyl group, a methyl group, a triethylsilyl group, a diphenylmethylsilyl group, a 1-methyl-1-phenylethyl group, a 1,1-dimethylpropyl group, a 2-chlorophenyl group, and the like, but are not limited to these.

The fore-mentioned chelating ligand indicates a ligand having a plural number of coordinating positions, and specific examples thereof include acetylacetonate, diimine, oxazoline, bisoxazoline, terpyridine, acyl hydrazone, diethylenetriamine, triethylenetetramine, porphyrin, a crown ether, a cryptate and the like.

The mutual groups having the cyclopentadienyl type anion skeleton, and the group of the group having a cyclopentadienyl type anion skeleton and the group containing a hetero atom, or the mutual groups containing a hetero atom may be directly linked, or may be linked through a residual group containing a carbon atom, a silicone atom, a nitrogen atom, an oxygen atom, a sulfur atom or a phosphorus atom, respectively. Examples of the residual group include alkylene groups such as an ethylene group, a propylene group and the like; substituted alkylene groups such as a dimethylmethylene group, a diphenylmethylene group and the like; a silylene group; substituted silylene groups such as a dimethylsilylene group, a diphenylsilylene group, a tetramethyldisilylene group and the like; and hetero atoms such as a nitrogen atom, an oxygen atom, a sulfur atom, a phosphorus atom and the like, etc.

X in the general formula [4] is a halogen atom or a hydrocarbon group. Specific examples of X include halogen atom such as a fluorine atom, a chlorine atom, a bromine atom and an iodine atom, and specific examples of the hydrocarbon group include a methyl group, an ethyl group, a n-propyl group, an isopropyl group, a n-butyl group, a phenyl group, a benzyl group and the like. X is preferably a halogen atom, an alkyl group having 1 to 24 carbon atoms or an aralkyl group having 7 to 24 carbon atoms.

"a" in the general formula [4] represents a figure satisfying $0<a\leq8$, and "b" represents a figure satisfying $0<b\leq8$, and are appropriately selected in accordance with the valent number of M.

Among the metal compound represented by the general formula [4], specific examples of the compound in which a transition metal is a titanium atom include bis(cyclopentadienyl)titanium dichloride, bis(methylcyclopentadienyl)titanium dichloride, bis(n-butylcyclopentadienyl)titanium dichloride, bis(dimethylcyclopentadienyl)titanium dichloride, bis(ethylmethylcyclopentadienyl)titanium dichloride, bis(trimethylcyclopentadienyl)titanium dichloride, bis(tetramethylcyclopentadienyl)titanium dichloride, bis(pentamethylcyclopentadienyl)titanium dichloride, bis(indenyl)titanium dichloride, bis(4,5,6,7-tetrahydroindenyl)titanium dichloride, bis(fluorenyl)titanium dichloride, bis(2-phenylindenyl)titanium dichloride, bis[2-(bis-3,5-trifluoromethylphenyl)indenyl]titanium dichloride, bis[2-(4-tert-butylphenyl)indenyl]titanium dichloride, bis[2-(4-trifluoromethylphenyl) indenyl]titanium dichloride, bis[2-(4-methylphenyl)indenyl]titanium dichloride, bis[2-(3,5-dimethylphenyl)indenyl]titanium dichloride, bis[2-(pentafluorophenyl)indenyl]titanium dichloride, cyclopentadienyl (pentamethylcyclopentadienyl)titanium dichloride, cyclopentadienyl(indenyl)titanium dichloride, cyclopentadienyl(fluorenyl)titanium dichloride, indenyl (fluorenyl)titanium dichloride, pentamethylcyclopentadienyl(indenyl)titanium dichloride, pentamethylcyclopentadienyl (fluorenyl)titanium dichloride, cyclopentadienyl(2-phenylindenyl)titanium dichloride, pentamethylcyclopentadienyl(2-phenylindenyl) titanium dichloride, ethylenebis(cyclopentadienyl)titanium dichloride, ethylenebis(2-methylcyclopentadienyl)titanium dichloride, ethylenebis(3-methylcyclopentadienyl)titanium dichloride, ethylenebis(2-n-butylcyclopentadienyl)titanium dichloride, ethylenebis(3-n-butylcyclopentadienyl)titanium dichloride, ethylenebis(2,3-dimethylcyclopentadienyl) titanium dichloride, ethylenebis (2,4-dimethylcyclopentadienyl)titanium dichloride, ethylenebis (2,5-dimethylcyclopentadienyl)titanium dichloride, ethylenebis(3,4-dimethylcyclopentadienyl)titanium dichloride, ethylenebis(2,3-ethylmethylcyclopentadienyl) titanium dichloride, ethylenebis(2,4-ethylmethylcyclopentadienyl)titanium dichloride, ethylenebis(2,5-ethylmethylcyclopentadienyl)titanium dichloride, ethylenebis(3,5-ethylmethylcyclopentadienyl) titanium dichloride, ethylenebis(2,3,4-trimethycyclopentadienyl)titanium dichloride, ethylenebis (2,3,5-trimethylcyclopentadienyl)titanium dichloride, ethylenebis(tetramethylcyclopentadienyl)titanium dichloride, ethylenebis(indenyl)titanium dichloride, ethylenebis(4,5,6,7-tetrahydroindenyl)titanium dichloride, ethylenebis(2-phenylindenyl)titanium dichloride, ethylenebis(fluorenyl)titanium dichloride, ethylene (cyclopentadienyl) (pentamethylcyclopentadienyl)titanium dichloride, ethylene(cyclopentadienyl)(indenyl)titanium dichloride, ethylene(methylcyclopentadienyl)(indenyl) titanium dichloride, ethylene(n-butylcyclopentadienyl) (indenyl)titanium dichloride, ethylene (tetramethylcyclopentadienyl)(indenyl)titanium dichloride, ethylene(cyclopentadienyl)(fluorenyl)titanium dichloride, ethylene(methylcyclopentadienyl)(fluorenyl)titanium dichloride, ethylene(pentamethylcyclopentadienyl) (fluorenyl)titanium dichloride, ethylene(n-butylcyclopentadienyl)(fluorenyl)titanium dichloride, ethylene(tetramethylpentadienyl)(fluorenyl)titanium dichloride, ethylene(indenyl)(fluorenyl)titanium dichloride, isopropylidenebis(cyclopentadienyl)titanium dichloride, isopropylidenebis(2-methylcyclopentadienyl)titanium dichloride, isopropylidenebis(3-methylcyclopentadienyl) titanium dichloride, isopropylidenebis(2-n-butylcyclopentadienyl)titanium dichloride, isopropylidenebis(3-n-butylcyclopentadienyl)titanium dichloride, isopropylidenebis(2,3-dimethylcyclopentadienyl) titanium dichloride, isopropylidenebis(2,4-dimethylcyclopentadienyl)titanium dichloride, isopropylidenebis(2,5-dimethylcyclopentadienyl)titanium dichloride, isopropylidenebis(3,4-dimethylcyclopentadienyl)titanium dichloride, isopropylidenebis(2,3-ethylmethylcyclopentadienyl)titanium dichloride, isopropylidenebis(2,4-ethylmethylcyclopentadienyl) titanium dichloride, isopropylidenebis(2,5-ethylmethylcyclopentadienyl)titanium dichloride, isopropylidenebis(3,5-ethylmethylcyclopentadienyl) titanium dichloride, isopropylidenebis(2,3,4-trimethylcyclopentadienyl)titanium dichloride, isopropylidenebis(2,3,5-trimethylcyclopentadienyl)titanium dichloride, isopropylidenebis(tetramethylcyclopentadienyl) titanium dichloride, isopropylidenebis(indenyl)titanium dichloride, isopropylidenebis(4,5,6,7-tetrahydroindenyl) titanium dichloride, isopropylidenebis(2-phenylindenyl) titanium dichloride, isopropylidenebis(fluorenyl)titanium dichloride, isopropylidene(cyclopentadienyl) (tetramethylcyclopentadienyl)titanium dichloride, isopropylidene(cyclopentadienyl)(indenyl)titanium dichloride, isopropylidene(methylcyclopentadienyl) (indenyl)titanium dichloride, isopropylidene(n-butylcyclopentadienyl)(indenyl)titanium dichloride, isopropylidene(tetramethylcyclopentadienyl)(indenyl) titanium dichloride, isopropylidene(cyclopentadienyl) (fluorenyl)titanium dichloride, isopropylidene (methylcyclopentadienyl)(fluorenyl)titanium dichloride, isopropylidene(n-butylcyclopentadienyl)(fluorenyl)titanium dichloride, isopropylidene(tetramethylcyclopentadienyl) (fluorenyl)titanium dichloride, isopropylidene(indenyl) (fluorenyl)titanium dichloride, dimethylsilylenebis (cyclopentadienyl)titanium dichloride, dimethylsilylenebis (2-methylcyclopentadienyl)titanium dichloride, dimethylsilylenebis(3-methylcyclopentadienyl)titanium dichloride, dimethylsilylenebis(2-n-butylcyclopentadienyl) titanium dichloride, dimethylsilylenebis(3-n-butylcyclopentadienyl)titanium dichloride, dimethylsilylenebis(2,3-dimethylcyclopentadienyl)titanium dichloride, dimethylsilylenebis(2,4-dimethylcyclopentadienyl)titanium dichloride, dimethylsilylenebis(2,5-dimethylcyclopentadienyl)titanium dichloride, dimethylsilylenebis(3,4-dimethylcyclopentadienyl)titanium dichloride, dimethylsilylenebis(2,3-ethylmethylcyclopentadienyl) titanium dichloride, dimethylsilylenebis(2,4-ethylmethylcyclopentadienyl)titanium dichloride, dimethylsilylenebis(2,5-ethylmethylcyclopentadienyl) titanium dichloride, dimethylsilylenebis(3,5-ethylmethylcyclopentadienyl)titanium dichloride, dimethylsilylenebis(2,3,4-trimethylcyclopentadienyl) titanium dichloride, dimethylsilylenebis(2,3,5-trimethylcyclopentadienyl)titanium dichloride, dimethylsilylenebis(tetramethylcyclopentadienyl)titanium dichloride, dimethylsilylenebis(indenyl)titanium dichloride, dimethylsilylenebis(4,5,6,7-tetrahydroindenyl)titanium dichloride, dimethylsilylene(cyclopentadienyl)(indenyl) titanium dichloride, dimethylsilylene (methylcyclopentadienyl)(indenyl)titanium dichloride, dimethylsilylene(n-butylcyclopentadienyl)(indenyl) titanium dichloride, dimethylsilylene (tetramethylcyclopentadienyl)(indenyl)titanium dichloride, dimethylsilylene(cyclopentadienyl)(fluorenyl)titanium dichloride, dimethylsilylene-(methylcyclopentadienyl) (fluorenyl)titanium dichloride, dimethylsilylene(n-butylcyclopentadienyl)(fluorenyl)titanium dichloride, dimethylsilylene(tetramethylcyclopentadienyl)(indenyl) titanium dichloride, dimethylsilylene (indenyl)(fluorenyl) titanium dichloride, cyclopentadienyltitanium trichloride, pentamethylcyclopentadienyltitanium trichloride, cyclopentadienyl (dimethylamido )titanium dichloride, cyclopentadienyl(phenoxy)titanium dichloride, cyclopentadienyl(2,6-dimethylphenyl)titanium dichloride, cyclopentadienyl (2,6-diisopropylphenyl)titanium dichloride, cyclopentadienyl(2,6-di-tert-butylphenyl) titanium dichloride, pentamethylcyclopentadienyl(2,6-dimethylphenyl)titanium dichloride, pentamethylcyclopentadienyl(2,6-diisopropylphenyl) titanium dichloride, pentamethylcyclopentadienyl(2,6-tert-butylphenyl)titanium dichloride, indenyl(2,6-diisopropylphenyl)titanium dichloride, fluorenyl(2,6-diisopropylphenyl)titanium dichloride, methylene(cyclopentadienyl)(3,5-dimethyl-2-phenoxy) titanium dichloride, methylene(cyclopentadienyl)(3-tert-butyl-2-phenoxy)titanium dichloride, methylene (cyclopentadienyl)(3-tert-butyl-5-methyl-2-phenoxy) titanium dichloride, methylene(cyclopentadienyl)(3-phenyl-2-phenoxy)titanium dichloride, methylene (cyclopentadienyl)(3-tert-butyldimethylsilyl-5-methyl-2-phenoxy)titanium dichloride, methylene(cyclopentadienyl) (3-trimethylsilyl-5-methyl-2-phenoxy)titanium dichloride, methylene(cyclopentadienyl)(3-tert-butyl-5-methoxy-2-phenoxy)titanium dichloride, methylene(cyclopentadienyl) (3-tert-butyl-5-chloro-2-phenoxy)titanium dichloride, methylene(methylcyclopentadienyl)(3,5-dimethyl-2-phenoxy)titanium dichloride, methylene (methylcyclopentadienyl)(3-tert-butyl-2-phenoxy)titanium dichloride, methylene(methylcyclopentadienyl)(3-tert-butyl-5-methyl-2-phenoxy)titanium dichloride, methylene (methylcyclopentadienyl)(3-phenyl-2-phenoxy)titanium dichloride, methylene(methylcyclopentadienyl)(3-tert-butyldimethylsilyl-5-methyl-2-phenoxy)titanium dichloride, methylene(methylcyclopentadienyl)(3-trimethylsilyl-5-methyl-2-phenoxy)titanium dichloride, methylene(methylcyclopentadienyl)(3-tert-butyl-5-methoxy-2-phenoxy)titanium dichloride, methylene (methylcyclopentadienyl)(3-tert-butyl-5-chloro-2-phenoxy) titanium dichloride, methylene(tert-butylcyclopentadienyl)(3,5-dimethyl-2-phenoxy)titanium dichloride, methylene(tert-butylcyclopentadienyl)(3-tert-butyl-2-phenoxy)titanium dichloride, methylene(tert-butylcyclopentadienyl)(3-tert-butyl-5-methyl-2-phenoxy)titanium dichloride, methylene (tert-butylcyclopentadienyl)(3-phenyl-2-phenoxy)titanium dichloride, methylene(tert-butylcyclopentadienyl)(3-tert-butyldimethylsilyl-5-methyl-2-phenoxy)titanium dichloride, methylene(tert-butylcyclopentadienyl)(3-trimethylsilyl-5-methyl-2-phenoxy)titanium dichloride, methylene(tert-butylcyclopentadienyl)(3-tert-butyl-5-methoxy-2-phenoxy)titanium dichloride, methylene(tert-butylcyclopentadienyl)(3-tert-butyl-5-chloro-2-phenoxy) titanium dichloride, methylene(tetramethylcyclopentadienyl)(3,5-dimethyl-2-phenoxy)titanium dichloride, methylene (tetramethylcyclopentadienyl)(3-tert-butyl-2-phenoxy) titanium dichloride, methylene (tetramethylcyclopentadienyl)(3-tert-butyl-5-methyl-2-phenoxy)titanium dichloride, methylene (tetramethylcyclopentadienyl)(3-phenyl-2-phenoxy) titanium dichloride, methylene (tetramethylcyclopentadienyl)(3-tert-butyldimethylsilyl-5-methyl-2-phenoxy)titanium dichloride, methylene (tetramethylcyclopentadienyl)(3-trimethylsilyl-5-methyl-2-phenoxy)titanium dichloride, methylene (tetramethylcyclopentadienyl)(3-tert-butyl-5-methoxy-2-phenoxy)titanium dichloride, methylene (tetramethylcyclopentadienyl)(3-tert-butyl-5-chloro-2-phenoxy)titanium dichloride, methylene (trimethylsilylcyclopentadienyl)(3,5-dimethyl-2-phenoxy) titanium dichloride, methylene (trimethylsilylcyclopentadienyl)(3-tert-butyl-2-phenoxy) titanium dichloride, methylene (trimethylsilylcyclopentadienyl)(3-tert-butyl-5-methyl-2-phenoxy)titanium dichloride, methylene (trimethylsilylcyclopentadienyl)(3-phenyl-2-phenoxy) titanium dichloride, methylene (trimethylsilylcyclopentadienyl)(3-tert-butyldimethylsilyl-5-methyl-2-phenoxy)titanium dichloride, methylene(trimethylsilylcyclopentadienyl)(3-trimethylsilyl-5-methyl-2-phenoxy)titanium dichloride, methylene(trimethylsilylcyclopentadienyl)(3-tert-butyl-5-methoxy-2-phenoxy)titanium dichloride, methylene(trimethylsilylcyclopentadienyl)(3-tert-butyl-5-chloro-2-phenoxy)titanium dichloride, methylene(fluorenyl)(3,5-dimethyl-2-phenoxy)titanium dichloride, methylene(fluorenyl)(3-tert-butyl-2-phenoxy)titanium dichloride, methylene(fluorenyl)(3-tert-butyl-5-methyl-2-phenoxy)titanium dichloride, methylene(fluorenyl)(3-phenyl-2-phenoxy)titanium dichloride, methylene(fluorenyl)(3-tert-butyldimethylsilyl-5-methyl-2-phenoxy)titanium dichloride, methylene(fluorenyl)(3-trimethylsilyl-5-methyl-2-phenoxy)titanium dichloride, methylene(fluorenyl)(3-tert-butyl-5-methoxy-2-phenoxy)titanium dichloride, methylene(fluorenyl)(3-tert-butyl-5-chloro-2-phenoxy)titanium dichloride, isopropylidene(cyclopentadienyl)(3,5-dimethyl-2-phenoxy)titanium dichloride, isopropylidene(cyclopentadienyl)(3-tert-butyl-2-phenoxy)titanium dichloride, isopropylidene(cyclopentadienyl)(3-tert-butyl-5-methyl-2-phenoxy)titanium dichloride, isopropylidene(cyclopentadienyl)(3-phenyl-2-phenoxy)titanium dichloride, isopropylidene(cyclopentadienyl)(3-tert-butyldimethylsilyl-5-methyl-2-phenoxy)titanium dichloride, isopropylidene(cyclopentadienyl)(3-trimethylsilyl-5-methyl-2-phenoxy)titanium dichloride, isopropylidene(cyclopentadienyl)(3-tert-butyl-5-methoxy-2-phenoxy)titanium dichloride, isopropylidene(cyclopentadienyl)(3-tert-butyl-5-chloro-2-phenoxy)titanium dichloride, isopropylidene(methylcyclopentadienyl)(3,5-dimethyl-2-phenoxy)titanium dichloride, isopropylidene(methylcyclopentadienyl)(3-tert-butyl-2-phenoxy)titanium dichloride, isopropylidene(methylcyclopentadienyl)(3-tert-butyl-5-methyl-2-phenoxy)titanium dichloride, isopropylidene(methylcyclopentadienyl)(3-phenyl-2-phenoxy)titanium dichloride, isopropylidene(methylcyclopentadienyl)(3-tert-butyldimethylsilyl-5-methyl-2-phenoxy)titanium dichloride, isopropylidene(methylcyclopentadienyl)(3-trimethylsilyl-5-methyl-2-phenoxy)titanium dichloride, isopropylidene(methylcyclopentadienyl)(3-tert-butyl-5-methoxy-2-phenoxy)titanium dichloride, isopropylidene(methylcyclopentadienyl)(3-tert-butyl-5-chloro-2-phenoxy)titanium dichloride, isopropylidene(tert-butylcyclopentadienyl)(3,5-dimethyl-2-phenoxy)titanium dichloride, isopropylidene(tert-butylcyclopentadienyl)(3-tert-butyl-2-phenoxy)titanium dichloride, isopropylidene(tert-butylcyclopentadienyl)(3-tert-butyl-5-methyl-2-phenoxy)titanium dichloride, isopropylidene(tert-butylcyclopentadienyl)(3-phenyl-2-phenoxy)titanium dichloride, isopropylidene(tert-butylcyclopentadienyl)(3-tert-butyldimethylsilyl-5-methyl-2-phenoxy)titanium dichloride, isopropylidene(tert-butylcyclopentadienyl)(3-trimethylsilyl-5-methyl-2-phenoxy)titanium dichloride, isopropylidene(tert-butylcyclopentadienyl)(3-tert-butyl-5-methoxy-2-phenoxy)titanium dichloride, isopropylidene(tert-butylcyclopentadienyl)(3-tert-butyl-5-chloro-2-phenoxy)titanium dichloride, isopropylidene(tetramethylcyclopentadienyl)(3,5-dimethyl-2-phenoxy)titanium dichloride, isopropylidene(tetramethylcyclopentadienyl)(3-tert-butyl-2-phenoxy)titanium dichloride, isopropylidene(tetramethylcyclopentadienyl)(3-tert-butyl-5-methyl-2-phenoxy)titanium dichloride, isopropylidene(tetramethylcyclopentadienyl)(3-phenyl-2-phenoxy)titanium dichloride, isopropylidene(tetramethylcyclopentadienyl)(3-tert-butyldimethylsilyl-5-methyl-2-phenoxy)titanium dichloride, isopropylidene(tetramethylcyclopentadienyl)(3-trimethylsilyl-5-methyl-2-phenoxy)titanium dichloride, isopropylidene(tetramethylcyclopentadienyl)(3-tert-butyl-5-methoxy-2-phenoxy)titanium dichloride, isopropylidene(tetramethylcyclopentadienyl)(3-tert-butyl-5-chloro-2-phenoxy)titanium dichloride, isopropylidene(trimethylsilylcyclopentadienyl)(3,5-dimethyl-2-phenoxy)titanium dichloride, isopropylidene(trimethylsilylcyclopentadienyl)(3-tert-butyl-2-phenoxy)titanium dichloride, isopropylidene(trimethylsilylcyclopentadienyl)(3-tert-butyl-5-methyl-2-phenoxy)titanium dichloride, isopropylidene(trimethylsilylcyclopentadienyl)(3-phenyl-2-phenoxy)titanium dichloride, isopropylidene(trimethylsilylcyclopentadienyl)(3-tert-butyldimethylsilyl-5-methyl-2-phenoxy)titanium dichloride, isopropylidene(trimethylsilylcyclopentadienyl)(3-trimethylsilyl-5-methyl-2-phenoxy)titanium dichloride, isopropylidene(trimethylsilylcyclopentadienyl)(3-tert-butyl-5-methoxy-2-phenoxy)titanium dichloride, isopropylidene(trimethylsilylcyclopentadienyl)(3-tert-butyl-5-chloro-2-phenoxy)titanium dichloride, isopropylidene(fluorenyl)(3,5-dimethyl-2-phenoxy)titanium dichloride, isopropylidene(fluorenyl)(3-tert-butyl-2-phenoxy)titanium dichloride, isopropylidene(fluorenyl)(3-tert-butyl-5-methyl-2-phenoxy)titanium dichloride, isopropylidene(fluorenyl)(3-phenyl-2-phenoxy)titanium dichloride, isopropylidene(fluorenyl)(3-tert-butyldimethylsilyl-5-methyl-2-phenoxy)titanium dichloride, isopropylidene(fluorenyl)(3-trimethylsilyl-5-methyl-2-phenoxy)titanium dichloride, isopropylidene(fluorenyl)(3-tert-butyl-5-methoxy-2-phenoxy)titanium dichloride, isopropylidene(fluorenyl)(3-tert-butyl-5-chloro-2-phenoxy)titanium dichloride, diphenylmethylene(cyclopentadienyl)(3,5-dimethyl-2-phenoxy)titanium dichloride, diphenylmethylene(cyclopentadienyl)(3-tert-butyl-2-phenoxy)titanium dichloride, diphenylmethylene(cyclopentadienyl)(3-tert-butyl-5-methyl-2-phenoxy)titanium dichloride, diphenylmethylene(cyclopentadienyl)(3-phenyl-2-phenoxy)titanium dichloride, diphenylmethylene(cyclopentadienyl)(3-tert-butyldimethylsilyl-5-methyl-2-phenoxy)titanium dichloride, diphenylmethylene(cyclopentadienyl)(3-trimethylsilyl-5-methyl-2-phenoxy)titanium dichloride, diphenylmethylene(cyclopentadienyl)(3-tert-butyl-5-methoxy-2-phenoxy)titanium dichloride, diphenylmethylene(cyclopentadienyl)(3-tert-butyl-5-chloro-2-phenoxy)titanium dichloride, diphenylmethylene(methylcyclopentadienyl)(3,5-dimethyl-2-phenoxy)titanium dichloride, diphenylmethylene(methylcyclopentadienyl)(3-tert-butyl-2-phenoxy)titanium dichloride, diphenylmethylene(methylcyclopentadienyl)(3-tert-butyl-5-methyl-2-phenoxy)titanium dichloride, diphenylmethylene(methylcyclopentadienyl)(3-phenyl-2-phenoxy)titanium dichloride, diphenylmethylene(methylcyclopentadienyl)(3-tert-butyldimethylsilyl-5-methyl-2-phenoxy)titanium dichloride, diphenylmethylene(methylcyclopentadienyl)(3-trimethylsilyl-5-methyl-2-phenoxy)titanium dichloride, diphenylmethylene(methylcyclopentadienyl)(3-tert-butyl-5-methoxy-2-phenoxy)titanium dichloride, diphenylmethylene(methylcyclopentadienyl)(3-tert-butyl-5-chloro-2-phenoxy)titanium dichloride, diphenylmethylene(tert-butylcyclopentadienyl)(3,5-dimethyl-2-phenoxy)titanium dichloride, diphenylmethylene(tert-butylcyclopentadienyl)(3-tert-butyl-2-phenoxy)titanium dichloride, diphenylmethylene(tert-butylcyclopentadienyl)(3-tert-butyl-5-methyl-2-phenoxy)titanium dichloride, diphenylmethylene(tert-butylcyclopentadienyl)(3-phenyl-2-phenoxy)titanium dichloride, diphenylmethylene(tert-butylcyclopentadienyl)(3-tert-butyldimethylsilyl-5-methyl-2-phenoxy)titanium dichloride, diphenylmethylene(tert-butylcyclopentadienyl)(3-trimethylsilyl-5-methyl-2-phenoxy)titanium dichloride, diphenylmethylene(tert-butylcyclopentadienyl)(3-tert-butyl-5-methoxy-2-phenoxy)titanium dichloride, diphenylmethylene(tert-butylcyclopentadienyl)(3-tert-butyl-5-chloro-2-phenoxy)titanium dichloride, diphenylmethylene(tetramethylcyclopentadienyl)(3,5-dimethyl-2-phenoxy)titanium dichloride, diphenylmethylene(tetramethylcyclopentadienyl)(3-tert-butyl-2-phenoxy)titanium dichloride, diphenylmethylene(tetramethylcyclopentadienyl)(3-tert-butyl-5-methyl-2-phenoxy)titanium dichloride, diphenylmethylene(tetramethylcyclopentadienyl)(3-phenyl-2-phenoxy)titanium dichloride, diphenylmethylene(tetramethylcyclopentadienyl)(3-tert-butyldimethylsilyl-5-methyl-2-phenoxy)titanium dichloride, diphenylmethylene(tetramethylcyclopentadienyl)(3-trimethylsilyl-5-methyl-2-phenoxy)titanium dichloride, diphenylmethylene(tetramethylcyclopentadienyl)(3-tert-butyl-5-methoxy-2-phenoxy)titanium dichloride, diphenylmethylene(tetramethylcyclopentadienyl)(3-tert-butyl-5-chloro-2-phenoxy)titanium dichloride, diphenylmethylene(trimethylsilylcyclopentadienyl)(3,5-dimethyl-2-phenoxy)titanium dichloride, diphenylmethylene(trimethylsilylcyclopentadienyl)(3-tert-butyl-2-phenoxy)titanium dichloride, diphenylmethylene(trimethylsilylcyclopentadienyl)(3-tert-butyl-5-methyl-2-phenoxy)titanium dichloride, diphenylmethylene(trimethylsilylcyclopentadienyl)(3-phenyl-2-phenoxy)titanium dichloride, diphenylmethylene(trimethylsilylcyclopentadienyl)(3-tert-butyldimethylsilyl-5-methyl-2-phenoxy)titanium dichloride, diphenylmethylene(trimethylsilylcyclopentadienyl)(3-trimethylsilyl-5-methyl-2-phenoxy)titanium dichloride, diphenylmethylene(trimethylsilylcyclopentadienyl)(3-tert-butyl-5-methoxy-2-phenoxy)titanium dichloride, diphenylmethylene(trimethylsilylcyclopentadienyl)(3-tert-butyl-5-chloro-2-phenoxy)titanium dichloride, diphenylmethylene(fluorenyl)(3,5-dimethyl-2-phenoxy)titanium dichloride, diphenylmethylene(fluorenyl)(3-tert-butyl-2-phenoxy)titanium dichloride, diphenylmethylene(fluorenyl)(3-tert-butyl-5-methyl-2-phenoxy)titanium dichloride, diphenylmethylene(fluorenyl)(3-phenyl-2-phenoxy)titanium dichloride, diphenylmethylene(fluorenyl)(3-tert-butyldimethylsilyl-5-methyl-2-phenoxy)titanium dichloride, diphenylmethylene(fluorenyl)(3-trimethylsilyl-5-methyl-2-phenoxy)titanium dichloride, diphenylmethylene(fluorenyl)(3-tert-butyl-5-methoxy-2-phenoxy)titanium dichloride, diphenylmethylene(fluorenyl)(3-tert-butyl-5-chloro-2-phenoxy)titanium dichloride, dimethylsilylene(cyclopentadienyl)(2-phenoxy)titanium dichloride, dimethylsilylene(cyclopentadienyl)(3-methyl-2-phenoxy)titanium dichloride, dimethylsilylene(cyclopentadienyl)(3,5-dimethyl-2-phenoxy)titanium dichloride, dimethylsilylene(cyclopentadienyl)(3-tert-butyl-2-phenoxy)titanium dichloride, dimethylsilylene(cyclopentadienyl)(3-tert-butyl-5-methyl-2-phenoxy)titanium dichloride, dimethylsilylene(cyclopentadienyl)(3,5-di-tert-butyl-2-phenoxy)titanium dichloride, dimethylsilylene(cyclopentadienyl)(5-methyl-3-phenyl-2-phenoxy)titanium dichloride, dimethylsilylene(cyclopentadienyl)(3-tert-butyldimethylsilyl-5-methyl-2-phenoxy)titanium dichloride, dimethylsilylene(cyclopentadienyl)(5-methyl-3-trimethylsilyl-2-phenoxy)titanium dichloride, dimethylsilylene(cyclopentadienyl)(3-tert-butyl-5-methoxy-2-phenoxy)titanium dichloride, dimethylsilylene(cyclopentadienyl)(3-tert-butyl-5-chloro-2-phenoxy)titanium dichloride, dimethylsilylene(cyclopentadienyl)(3,5-diamyl-2-phenoxy)titanium dichloride, dimethylsilylene(methylcyclopentadienyl)(2-phenoxy)titanium dichloride, dimethylsilylene(methylcyclopentadienyl)(3-methyl-2-phenoxy)titanium dichloride, dimethylsilylene(methylcyclopentadienyl)(3,5-dimethyl-2-phenoxy)titanium dichloride, dimethylsilylene(methylcyclopentadienyl)(3-tert-butyl-2-phenoxy)titanium dichloride, dimethylsilylene(methylcyclopentadienyl)(3-tert-butyl-5-methyl-2-phenoxy)titanium dichloride, dimethylsilylene(methylcyclopentadienyl)(3,5-di-tert-butyl-2-phenoxy)titanium dichloride, dimethylsilylene(methylcyclopentadienyl)(5-methyl-3-phenyl-2-phenoxy)titanium dichloride, dimethylsilylene(methylcyclopentadienyl)(3-tert-butyldimethylsilyl-5-methyl-2-phenoxy)titanium dichloride, dimethylsilylene(methylcyclopentadienyl)(5-methyl-3-trimethylsilyl-2-phenoxy)titanium dichloride, dimethylsilylene(methylcyclopentadienyl)(3-tert-butyl-5-methoxy-2-phenoxy)titanium dichloride, dimethylsilylene(methylcyclopentadienyl)(3-tert-butyl-5-chloro-2-phenoxy)titanium dichloride, dimethylsilylene(methylcyclopentadienyl)(3,5-diamyl-2-phenoxy)titanium dichloride, dimethylsilylene(n-butylcyclopentadienyl)(2-phenoxy)titanium dichloride, dimethylsilylene(n-butylcyclopentadienyl)(3-methyl-2-phenoxy)titanium dichloride, dimethylsilylene(n-butylcyclopentadienyl)(3,5-dimethyl-2-phenoxy)titanium dichloride, dimethylsilylene(n-butylcyclopentadienyl)(3-tert-butyl-2-phenoxy)titanium dichloride, dimethylsilylene(n-butylcyclopentadienyl)(3-tert-butyl-5-methyl-2-phenoxy)titanium dichloride, dimethylsilylene(n-butylcyclopentadienyl)(3,5-di-tert-butyl-2-phenoxy)titanium dichloride, dimethylsilylene(n-butylcyclopentadienyl)(5-methyl-3-phenyl-2-phenoxy)titanium dichloride, dimethylsilylene(n-butylcyclopentadienyl)(3-tert-butyldimethylsilyl-5-methyl-2-phenoxy)titanium dichloride, dimethylsilylene(n-butylcyclopentadienyl)(5-methyl-3-trimethylsilyl-2-phenoxy)titanium dichloride, dimethylsilylene(n-butylcyclopentadienyl)(3-tert-butyl-5-methoxy-2-phenoxy)titanium dichloride, dimethylsilylene(n-butylcyclopentadienyl)(3-tert-butyl-5-chloro-2-phenoxy)titanium dichloride, dimethylsilylene(n-butylcyclopentadienyl)(3,5-diamyl-2-phenoxy)titanium dichloride, dimethylsilylene(tert-butylcyclopentadienyl)(2-phenoxy)titanium dichloride, dimethylsilylene(tert-butylcyclopentadienyl)(3-methyl-2-phenoxy)titanium dichloride, dimethylsilylene(tert-butylcyclopentadienyl)(3,5-dimethyl-2-phenoxy)titanium dichloride, dimethylsilylene(tert-butylcyclopentadienyl)(3-tert-butyl-2-phenoxy)titanium dichloride, dimethylsilylene(tert-butylcyclopentadienyl)(3-tert-butyl-5-methyl-2-phenoxy)titanium dichloride, dimethylsilylene(tert-butylcyclopentadienyl)(3,5-di-tert-butyl-2-phenoxy)

titanium dichloride, dimethylsilylene(tert-butylcyclopentadienyl)(5-methyl-3-phenyl-2-phenoxy) titanium dichloride, dimethylsilylene(tert-butylcyclopentadienyl)(3-tert-butyldimethylsilyl-5-methyl-2-phenoxy)titanium dichloride, dimethylsilylene(tert-butylcyclopentadienyl)(5-methyl-3-trimethylsilyl-2-phenoxy)titanium dichloride, dimethylsilylene(tert-butylcyclopentadienyl)(3-tert-butyl-5-methoxy-2-phenoxy) titanium dichloride, dimethylsilylene(tert-butylcyclopentadienyl)(3-tert-butyl-5-chloro-2-phenoxy) titanium dichloride, dimethylsilylene(tert-butylcyclopentadienyl)(3,5-diamyl-2-phenoxy)titanium dichloride, dimethylsilylene(tetramethylcyclopentadienyl)(2-phenoxy)titanium dichloride, dimethylsilylene (tetramethylcyclopentadienyl)(3-methyl-2-phenoxy) titanium dichloride, dimethylsilylene (tetramethylcyclopentadienyl)(3,5-dimethyl-2-phenoxy) titanium dichloride, dimethylsilylene (tetramethylcyclopentadienyl)(3-tert-butyl-2-phenoxy) titanium dichloride, dimethylsilylene (tetramethylcyclopentadienyl)(3-tert-butyl-5-methyl-2-phenoxy)titanium dichloride, dimethylsilylene (tetramethylcyclopentadienyl)(3,5-di-tert-butyl-2-phenoxy) titanium dichloride, dimethylsilylene (tetramethylcyclopentadienyl)(5-methyl-3-phenyl-2-phenoxy)titanium dichloride, dimethylsilylene (tetramethylcyclopentadienyl)(3-tert-butyldimethylsilyl-5-methyl-2-phenoxy)titanium dichloride, dimethylsilylene (tetramethylcyclopentadienyl)(5-methyl-3-trimethylsilyl-2-phenoxy)titanium dichloride, dimethylsilylene (tetramethylcyclopentadienyl)(3-tert-butyl-5-methoxy-2-phenoxy)titanium dichloride, dimethylsilylene (tetramethylcyclopentadienyl)(3-tert-butyl-5-chloro-2-phenoxy)titanium dichloride, dimethylsilylene (tetramethylcyclopentadienyl)(3,5-diamyl-2-phenoxy) titanium dichloride, dimethylsilylene(trimethylsilylcyclopentadienyl)(2-phenoxy)titanium dichloride, dimethylsilylene (trimethylsilylcyclopentadienyl)(3-methyl-2-phenoxy) titanium dichloride, dimethylsilylene (trimethylsilylcyclopentadienyl)(3,5-dimethyl-2-phenoxy) titanium dichloride, dimethylsilylene (trimethylsilylcyclopentadienyl)(3-tert-butyl-2-phenoxy) titanium dichloride, dimethylsilylene (trimethylsilylcyclopentadienyl)(3-tert-butyl-5-methyl-2-phenoxy)titanium dichloride, dimethylsilylene (trimethylsilylcyclopentadienyl)(3,5-di-tert-butyl-2-phenoxy)titanium dichloride, dimethylsilylene (trimethylsilylcyclopentadienyl)(5-methyl-3-phenyl-2-phenoxy)titanium dichloride, dimethylsilylene (trimethylsilylcyclopentadienyl)(3-tert-butyldimethylsilyl-5-methyl-2-phenoxy)titanium dichloride, dimethylsilylene (trimethylsilylcyclopentadienyl)(5-methyl-3-trimethylsilyl-2-phenoxy)titanium dichloride, dimethylsilylene (trimethylsilylcyclopentadienyl)(3-tert-butyl-5-methoxy-2-phenoxy)titanium dichloride, dimethylsilylene (trimethylsilylcyclopentadienyl)(3-tert-butyl-5-chloro-2-phenoxy)titanium dichloride, dimethylsilylene (trimethylsilylcyclopentadienyl)(3,5-diamyl-2-phenoxy) titanium dichloride, dimethylsilylene(indenyl)(2-phenoxy)titanium dichloride, dimethylsilylene(indenyl)(3-methyl-2-phenoxy) titanium dichloride, dimethylsilylene(indenyl)(3,5-dimethyl-2-phenoxy)titanium dichloride, dimethylsilylene (indenyl)(3-tert-butyl-2-phenoxy)titanium dichloride, dimethylsilylene(indenyl)(3-tert-butyl-5-methyl-2-phenoxy)titanium dichloride, dimethylsilylene(indenyl)(3,5-di-tert-butyl-2-phenoxy)titanium dichloride, dimethylsilylene(indenyl)(5-methyl-3-phenyl-2-phenoxy) titanium dichloride, dimethylsilylene(indenyl)(3-tert-butyldimethylsilyl-5-methyl-2-phenoxy)titanium dichloride, dimethylsilylene(indenyl)(5-methyl-3-trimethylsilyl-2-phenoxy)titanium dichloride, dimethylsilylene(indenyl)(3-tert-butyl-5-methoxy-2-phenoxy)titanium dichloride, dimethylsilylene(indenyl)(3-tert-butyl-5-chloro-2-phenoxy)titanium dichloride, dimethylsilylene(indenyl)(3,5-diamyl-2-phenoxy)titanium dichloride, dimethylsilylene(fluorenyl)(2-phenoxy)titanium dichloride, dimethylsilylene(fluorenyl)(3-methyl-2-phenoxy)titanium dichloride, dimethylsilylene(fluorenyl)(3,5-dimethyl-2-phenoxy)titanium dichloride, dimethylsilylene(fluorenyl)(3-tert-butyl-2-phenoxy) titanium dichloride, dimethylsilylene(fluorenyl)(3-tert-butyl-5-methyl-2-phenoxy)titanium dichloride, dimethylsilylene(fluorenyl)(3,5-di-tert-butyl-2-phenoxy) titanium dichloride, dimethylsilylene(fluorenyl)(5-methyl-3-phenyl-2-phenoxy)titanium dichloride, dimethylsilylene (fluorenyl)(3-tert-butyldimethylsilyl-5-methyl-2-phenoxy) titanium dichloride, dimethylsilylene(fluorenyl)(5-methyl-3-trimethylsilyl-2-phenoxy)titanium dichloride, dimethylsilylene(fluorenyl)(3-tert-butyl-5-methoxy-2-phenoxy)titanium dichloride, dimethylsilylene(fluorenyl)(3-tert-butyl-5-chloro-2-phenoxy)titanium dichloride, dimethylsilylene(fluorenyl)(3,5-diamyl-2-phenoxy)titanium dichloride, dimethylsilylene(tetramethylcyclopentadienyl) (1-naphthox-2-yl)titanium dichloride, (tert-butylamido) tetramethylcyclopentadienyl-1,2-ethanediyltitanium dichloride, (tert-butylamido)tetramethylcyclopentadienyl-1, 2ethanediyltitanium dimethyl, (tert-butylamido) tetramethylcyclopentadienyl-1,2-ethanediyltitanium dibenzyl, (methylamido)tetramethylcyclopentadienyl-1,2-ethanediyltitanium dichloride, (ethylamido) tetramethylcyclopentadienyl-1,2-ethanediyltitanium dichloride, (tert-butylamido) tetramethylcyclopentadienyldimethylsilanetitanium dichloride, (tert-butylamido) tetramethylcyclopentadienyldimethylsilanetitanium dimethyl, (tert-butylamido) tetramethylcyclopentadienyldimethylsilanetitanium dibenzyl, (benzylamido) tetramethylcyclopentadienyldimethylsilanetitanium dichloride, (phenylphosphido) tetramethylcyclopentadienyldimethylsilanetitanium dibenzyl, (tert-butylamido)indenyl-1,2-ethanediyltitanium dichloride, (tert-butylamido)indenyl-1,2-ethanediyltitanium dimethyl, (tert-butylamido)tetrahydroindenyl-1,2-ethanediyltitanium dichloride, (tert-butylamido) tetrahydroindenyl-1,2-ethanediyltitanium dimethyl, (tert-butylamido)fluorenyl-1,2-ethanediyltitanium dichloride, (tert-butylamido)fluorenyl-1,2-ethanediyltitanium dimethyl, (tert-butylamido)indenyldimethylsilanetitanium dichloride, (tert-butylamido)indenyldimethylsilanetitanium dimethyl, (tert-butylamido)tetrahydroindenyldimethylsilanetitanium dichloride, (tert-butylamido) tetrahydroindenyldimethylsilanetitanium dimethyl, (tert-butylamido)fluorenyldimethylsilanetitanium dichloride, (tert-butylamido)fluorenyldimethylsilanetitanium dimethyl, (dimethylaminomethyl)tetramethylcyclopentadienyl-titanium(III) dichloride, (dimethylaminoethyl) tetramethylcyclopentadienyl-titanium(III) dichloride, (dimethylaminopropyl)tetramethylcyclopentadienyl-titanium(III) dichloride, (N-pyrrolidinylethyl)

tetramethylcyclopentadienyl-titanium dichloride, (B-dimethylaminoborabenzene)cyclopentadienylzirconium dichloride, cyclopentadienyl(9-mesitylboraanthracenyl) zirconium dichloride, 2,2'-thiobis(4-methyl-6-tert-butylphenoxy)titanium dichloride, 2,2'-thiobis[4-methyl-6-(1-methylethyl)phenoxy]titanium dichloride, 2,2'-thiobis(4,6-dimethylphenoxy)titanium dichloride, 2,2'-thiobis(4-methyl-6-tert-butylphenoxy)titanium dichloride, 2,2'-methylenebis(4-methyl-6-tert-butylphenoxy)titanium dichloride, 2,2'-ethylenebis(4-methyl-6-tert-butylphenoxy) titanium dichloride, 2,2'-sulfinylbis(4-methyl-6-tert-butylphenoxy)titanium dichloride, 2,2'-(4,4',6,6'tetra-tert-butyl-1,1'-biphenoxy)titanium dichloride, 2,2'-thiobis(4-methyl-6-tert-butylphenoxy)titanium diisopropoxide, 2,2'-methylenebis(4-methyl-6-tert-butylphenoxy)titanium diisopropoxide, 2,2'-ethylenebis(4-methyl-6-tert-butylphenoxy)titanium diisopropoxide, 2,2'-sulfinylbis(4-methyl-6-tert-butylphenoxy)titanium diisopropoxide, (di-tert-butyl-1,3-propanediamido)titanium dichloride, (dicyclohexyl-1,3-propanediamido)titanium dichloride, [bis(trimethylsilyl)-1,3-propanediamido]titanium dichloride, [bis(tert-butyldimethylsilyl)-1,3-propanediamido]titanium dichloride, [bis(2,6-dimethylphenyl)-1,3-propanediamido]titanium dichloride, [bis(2,6-diisopropylphenyl)-1,3-propanediamido]titanium dichloride, [bis(2,6-di-tert-butylphenyl)-1,3-propanediamido]titanium dichloride,

[bis(triisopropylsilyl)naphthalenediamido]titanium dichloride, [bis(trimethylsilyl)naphthalenediamido]titanium dichloride, [bis (tert-butyldimethylsilyl) naphthalenediamido]titanium dichloride, [bis(tert-butyldimethylsilyl)naphthalenediamido]titanium dibromide, [hydrotris(3,5-dimethylpyrazolyl)borate]titanium trichloride, [hydrotris(3,5-dimethylpyrazolyl)borate] titanium tribromide, [hydrotris(3,5-dimethylpyrazolyl) borate]titanium triiodide, [hydrotris(3,5-diethylpyrazolyl) borate]titanium trichloride, [hydrotris(3,5-diethylpyrazolyl) borate]titanium tribromide, [hydrotris(3,5-diethylpyrazolyl) borate]titanium triiodide,

[hydrotris(3,5-di-tert-butylpyrazolyl)borate]titanium trichloride, [hydrotris(3,5-di-tert-butylpyrazolyl)borate] titanium tribromide, [hydrotris(3,5-di-tert-butylpyrazolyl) borate]titanium triiodide, [tris(3,5-dimethylpyrazolyl) methyl]titanium trichloride, [tris(3,5-dimethylpyrazolyl) methyl]titanium tribromide, [tris(3,5-dimethylpyrazolyl) methyl]titanium triiodide, [tris(3,5-diethylpyrazolyl)methyl] titanium trichloride, [tris(3,5-diethylpyrazolyl)methyl] titanium tribromide, [tris (3,5-diethylpyrazolyl)methyl] titanium triiodide, [tris(3,5-di-tert-butylpyrazolyl)methyl] titanium trichloride, [tris(3,5-di-tert-butylpyrazolyl)methyl] titanium tribromide, [tris(3,5-di-tert-butylpyrazolyl)methyl] titanium triiodide and the like, compounds in which titanium of these compounds is replaced with zirconium or hafnium, compounds in which (2-phenoxy) is replaced with (3-phenyl-2-phenoxy), (3-trimethylsilyl-2-phenoxy) or (3-tert-butyldimethylsilyl-2-phenoxy), compounds in which dimethylsilylene is replaced with diethylsilylene, diphenylsilylene or dimethoxysilylene, compounds in which dichloride is replaced with difluoride, dibromide, diiodide dimethyl, dimethyl, diethyl, diisopropyl, bis (dimethylamido), bis(diethylamido), dimethoxide, diethoxide, di-n-butoxide, diisopropoxide or bis (diacetoxy)

Among metal compounds represented by the general formula [4], specific examples of the compound in which the metal atom is a nickel atom include 2,2'-methylenebis[(4R)-4-phenyl-5,5'-dimethyloxazoline]nickel dichloride, 2,2'-methylenebis[(4R)-4-phenyl-5,5'-dimethyloxazoline]nickel dibromide, 2,2'-methylenebis[(4R)-4-phenyl-5,5'-diethyloxazoline]nickel dichloride, 2,2'-methylenebis[(4R)-4-phenyl-5,5'-diethyloxazoline]nickel dibromide, 2,2'-methylenebis[(4R)-4-phenyl-5,5'-di-n-propyloxazoline] nickel dichloride, 2,2'-methylenebis[(4R)-4-phenyl-5,5'-di-n-propyloxazoline]nickel dibromide, 2,2'-methylenebis [(4R)-4-phenyl-5,5'-diisopropyloxazoline]nickel dichloride, 2,2'-methylenebis[(4R)-4-phenyl-5,5'-diisopropyloxazoline]nickel dibromide, 2,2'-methylenebis [(4R)-4-phenyl-5,5'-dicyclohexyloxazoline]nickel dichloride, 2,2'-methylenebis[(4R)-4-phenyl-5,5'-dicyclohexyloxazoline]nickel dibromide, 2,2'-methylenebis [(4R)-4-phenyl-5,5'-dimethoxyoxazoline]nickel dichloride, 2,2'-methylenebis[(4R)-4-phenyl-5,5'-dimethoxyoxazoline] nickel dibromide, 2,2'-methylenebis[(4R)-4-phenyl-5,5'-diethoxyoxazoline]nickel dichloride, 2,2'-methylenebis [(4R)-4-phenyl-5,5'-diethoxyoxazoline]nickel dibromide, 2,2'-methylenebis[(4R)-4-phenyl-5,5'-diphenyloxazoline] nickel dichloride, 2,2'-methylenebis[(4R)-4-phenyl-5,5'-diphenyloxazoline]nickel dibromide, methylenebis[(4R)-4-methyl-5,5'-di-(2-methylphenyl)oxazoline]nickel dibromide, methylenebis[(4R)-4-methyl-5,5'-di-(3-methylphenyl)oxazoline]nickel dibromide, methylenebis [(4R)-4-methyl-5,5'-di-(4-methylphenyl)oxazoline]nickel dibromide, methylenebis[(4R)-4-methyl-5,5'-di-(2-methoxyphenyl)oxazoline]nickel dibromide, methylenebis [(4R)-4-methyl-5,5'-di-(3-methoxyphenyl)oxazoline]nickel dibromide, methylenebis[(4R)-4-methyl-5,5'-di-(4-methoxyphenyl)oxazoline]nickel dibromide, methylenebis [spiro{(4R)-4-methyloxazoline-5,1'-cyclobutane}]nickel dibromide, methylenebis[spiro{(4R)-4-methyloxazoline-5,1'-cyclopentane}]nickel dibromide, methylenebis[spiro{(4R)-4-methyloxazoline-5,1'-cyclohexane}]nickel dibromide, methylenebis[spiro{(4R)-4-methyloxazoline-5,1'-cycloheptane}]nickel dibromide, 2,2'-methylenebis[(4R)-4-isopropyl-5,5-dimethyloxazoline]nickel dibromide, 2,2'-methylenebis[(4R)-4-isopropyl-5,5-diethyloxazoline]nickel dibromide, 2,2'-methylenebis[(4R)-4-isopropyl-5,5-di-n-propyloxazoline]nickel dibromide, methylenebis[(4R)-4-isopropyl-5,5-diisopropyloxazoline]nickel dibromide, 2,2'-methylenebis[(4R)-4-isopropyl-5,5-dicyclohexyloxazoline] nickel dibromide, 2,2'-methylenebis[(4R)-4-isopropyl-5,5-diphenyloxazoline]nickel dibromide, 2,2'-methylenebis [(4R)-4-isopropyl-5,5-di-(2-methylphenyl)oxazoline]nickel dibromide, 2,2'-methylenebis[(4R)-4-isopropyl-5,5-di-(3-methylphenyl)oxazoline]nickel dibromide, 2,2'-methylenebis[(4R)-4-isopropyl-5,5-di-(4-methylphenyl) oxazoline]nickel dibromide, 2,2'-methylenebis[(4R)-4-isopropyl-5,5-di-(2-methoxyphenyl)oxazoline]nickel dibromide, 2,2'-methylenebis[(4R)-4-isopropyl-5,5-di-(3-methoxyphenyl)oxazoline]nickel dibromide, 2,2'-methylenebis[(4R)-4-isopropyl-5,5-di-(4-methoxyphenyl) oxazoline]nickel dibromide, 2,2'-methylenebis[spiro{(4R)-4-isopropyloxazoline-5,1'-cyclobutane}]nickel dibromide, 2,2'-methylenebis[spiro{(4R)-4-isopropyloxazoline-5,1'-cyclopentane}]nickel dibromide, 2,2'-methylenebis[spiro{(4R)-4-isopropyloxazoline-5,1'-cyclohexane}]nickel dibromide, 2,2'-methylenebis[spiro{(4R)-4-isopropyloxazoline-5,1'-cycloheptane}]nickel dibromide, 2,2-methylenebis[(4R)-4-isobutyl-5,5-dimethyloxazoline] nickel dibromide, 2,2'-methylenebis[(4R)-4-isobutyl-5,5-diethyloxazoline]nickel dibromide, 2,2'-methylenebis[(4R)-4-isobutyl-5,5-di-n-propyloxazoline]nickel dibromide, 2,2'-methylenebis[(4R)-4-isobutyl-5,5-diisopropyloxazoline] nickel dibromide, 2,2'-methylenebis[(4R)-4-isobutyl-5,5-dicyclohexyloxazoline]nickel dibromide, 2,2'-methylenebis [(4R)-4-isobutyl-5,5-diphenyloxazoline]nickel dibromide, 2,2'-methylenebis[(4R)-4-isobutyl-5,5-di-(2-methylphenyl)

oxazoline]nickel dibromide, 2,2'-methylenebis[(4R)-4-isobutyl-5,5-di-(3-methylphenyl)oxazoline]nickel dibromide, 2,2'-methylenebis[(4R)-4-isobutyl-5,5-di-(4-methylphenyl)oxazoline]nickel dibromide, 2,2'-methylenebis[(4R)-4-isobutyl-5,5-di-(2-methoxyphenyl)oxazoline]nickel dibromide, 2,2'-methylenebis[(4R)-4-isobutyl-5,5-di-(3-methoxyphenyl)oxazoline]nickel dibromide, 2,2'-methylenebis[(4R)-4-isobutyl-5,5-di-(4-methoxyphenyl)oxazoline]nickel dibromide, 2,2'-methylenebis[spiro{(4R)-4-isobutyloxazoline-5,1'-cyclobutane}]nickel dibromide, 2,2'-methylenebis[spiro{(4R)-4-isobutyloxazoline-5,1'-cyclopentane}]nickel dibromide, 2,2'-methylenebis[spiro{(4R)-4-isobutyloxazoline-5,1'-cyclohexane}]nickel dibromide, 2,2'-methylenebis[spiro{(4R)-4-isobutyloxazoline-5,1'-cycloheptane}]nickel dibromide, 2,2'-methylenebis[(4R)-4-tert-butyl-5,5-dimethyloxazoline]nickel dibromide, 2,2'-methylenebis[(4R)-4-tert-butyl-5,5-diethyloxazoline]nickel dibromide, 2,2'-methylenebis[(4R)-4-tert-butyl-5,5-di-n-propyloxazoline]nickel dibromide, 2,2'-methylenebis[(4R)-4-tert-butyl-5,5-diisopropyloxazoline]nickel dibromide, 2,2'-methylenebis[(4R)-4-tert-butyl-5,5-diphenyloxazoline]nickel dibromide, 2,2'-methylenebis[(4R)-4-tert-butyl-5,5-dicyclohexyloxazoline]nickel dibromide, 2,2'-methylenebis[(4R)-4-tert-butyl-5,5-di-(2-methylphenyl)oxazoline]nickel dibromide, 2,2'-methylenebis[(4R)-4-tert-butyl-5,5-di-(3-methylphenyl)oxazoline]nickel dibromide, 2,2'-methylenebis[(4R)-4-tert-butyl-5,5-di-(4-methylphenyl)oxazoline]nickel dibromide, 2,2'-methylenebis[(4R)-4-tert-butyl-5,5-di-(2-methoxyphenyl)oxazoline]nickel dibromide, 2,2'-methylenebis[(4R)-4-tert-butyl-5,5-di-(3-methoxyphenyl)oxazoline]nickel dibromide, 2,2'-methylenebis[(4R)-4-tert-butyl-5,5-di-(4-methoxyphenyl)oxazoline]nickel dibromide, 2,2'-methylenebis[spiro{(4R)-4-tert-butyloxazoline-5,1'-cyclobutane}]nickel dibromide, 2,2'-methylenebis[spiro{(4R)-4-tert-butyloxazoline-5,1'-cyclopentane}]nickel dibromide, 2,2'-methylenebis[spiro{(4R)-4-tert-butyloxazoline-5,1'-cyclohexane}]nickel dibromide, 2,2'-methylenebis[spiro{(4R)-4-tert-butyloxazoline-5,1'-cycloheptane}]nickel dibromide, 2,2'-methylenebis[(4R)-4-phenyl-5,5-dimethyloxazoline]nickel dibromide, 2,2'-methylenebis[(4R)-4-phenyl-5,5-diethyloxazoline]nickel dibromide, 2,2'-methylenebis[(4R)-4-phenyl-5,5-di-n-propyloxazoline]nickel dibromide, 2,2'-methylenebis[(4R)-4-phenyl-5,5-diisopropyloxazoline]nickel dibromide, 2,2'-methylenebis[(4R)-4-phenyl-5,5-dicyclohexyloxazoline]nickel dibromide, 2,2'-methylenebis[(4R)-4-phenyl-5,5-diphenyl)oxazoline]nickel dibromide, 2,2'-methylenebis[(4R)-4-phenyl-5,5-di-(2-methylphenyl)oxazoline]nickel dibromide, 2,2'-methylenebis[(4R)-4-phenyl-5,5-di-(3-methylpheny)oxazoline]nickel dibromide, 2,2'-methylenebis[(4R)-4-phenyl-5,5-di-(4-methylphenyl)oxazoline]nickel dibromide, 2,2'-methylenebis[(4R)-4-phenyl-5,5-di-(2-methoxyphenyl)oxazolinel]nickel dibromide, 2,2'-methylenebis[(4R)-4-phenyl-5,5-di-(3-methoxyphenyl)oxazoline]nickel dibromide, 2,2'-methylenebis[(4R)-4-phenyl-5,5-di-(4-methoxyphenyl)oxazoline]nickel dibromide, methylenebis[spiro{(4R)-4-phenyloxazoline-5,1'-cyclobutane}]nickel dibromide, 2,2'-methylenebis[spiro{(4R)-4-phenyloxazoline-5,1'-cyclopentane}]nickel dibromide, 2,2'-methylenebis[spiro{(4R)-4-phenyloxazoline-5,1'-cyclohexane}]nickel dibromide, 2,2'-methylenebis[spiro{(4R)-4-phenyloxazoline-5,1'-cycloheptane}]nickel dibromide, 2,2'-methylenebis[(4R)-4-benzyl-5,5-dimethyloxazoline]nickel dibromide, 2,2'-methylenebis[(4R)-4-benzyl-5,5-diethyloxazoline]nickel dibromide, 2,2'-methylenebis[(4R)-4-benzyl-5,5-di-n-propyloxazoline]nickel dibromide, 2,2'-methylenebis[(4R)-4-benzyl-5,5-diisopropyloxazoline]nickel dibromide, 2,2'-methylenebis[(4R)-4-benzyl-5,5-dicyclohexyloxazoline]nickel dibromide, 2,2'-methylenebis[(4R)-4-benzyl-5,5-diphenyl)oxazoline]nickel dibromide, 2,2'-methylenebis[(4R)-4-benzyl-5,5-di-(2-methylphenyl)oxazoline]nickel dibromide, 2,2'-methylenebis[(4R)-4-benzyl-5,5-di-(3-methylphenyl)oxazoline]nickel dibromide, 2,2'-methylenebis[(4R)-4-benzyl-5,5-di-(4-methylphenyl)oxazoline]nickel dibromide, 2,2'-methylenebis[(4R)-4-benzyl-5,5-di-(2-methoxyphenyl)oxazoline]nickel dibromide, 2,2'-methylenebis[(4R)-4-benzyl-5,5-di-(3-methoxyphenyl)oxazoline]nickel dibromide, 2,2'-methylenebis[(4R)-4-benzyl-5,5-di-(4-methoxyphenyl)oxazoline]nickel dibromide, 2,2'-methylenebis[spiro{(4R)-4-benzyloxazoline-5,1'-cyclobutane}]nickel dibromide, 2,2'-methylenebis[spiro{(4R)-4-benzyloxazoline-5,1'-cyclopentane}]nickel dibromide, 2,2'-methylenebis[spiro{(4R)-4-benzyloxazoline-5,1'-cyclohexane}]nickel dibromide, 2,2'-methylenebis[spiro{(4R)-4-benzyloxazoline-5,1'-cycloheptane}]nickel dibromide, and enantiomers of the above-mentioned compounds, etc. Further, compounds in which the configuration of an asymmetric carbon of one oxazoline ring of the above-mentioned bisoxazoline type compounds is inverted, and compounds in which dibromide of these compounds is replaced with dichloride, dimethyl, dimethoxide, or bis(acetoxy), are mentioned. Moreover, specific examples of the nickel compound include [hydrotris(3,5-dimethylpyrazolyl)borate]nickel chloride, [hydrotris(3,5-dimethylpyrazolyl)borate]nickel bromide, [hydrotris(3,5-dimethylpyrazolyl)borate]nickel iodide, [hydrotris(3,5-dimethylpyrazolyl)borate]nickel methyl, [hydrotris(3,5-dimethylpyrazolyl)borate]nickel ethyl, [hydrotris(3,5-dimethylpyrazolyl)borate]nickel allyl, [hydrotris(3,5-dimethylpyrazolyl)borate]nickel methallyl, [hydrotris(3,5-diethylpyrazolyl)borate]nickel chloride, [hydrotris(3,5-diethylpyrazolyl)borate]nickel bromide, [hydrotris(3,5-diethylpyrazolyl)borate]nickel iodide, [hydrotris(3,5-diethylpyrazolyl)borate]nickel methyl, [hydrotris(3,5-diethylpyrazolyl)borate]nickel ethyl, [hydrotris(3,5-diethylpyrazolyl)borate]nickel allyl, [hydrotris(3,5-diethylpyrazolyl)borate]nickel methallyl, [hydrotris(3,5-di-tert-butylpyrazolyl)borate]nickel chloride, [hydrotris(3,5-di-tert-butylpyrazolyl)borate]nickel bromide, [hydrotris(3,5-di-tert-butylpyrazolyl)borate]nickel iodide, [hydrotris(3,5-di-tert-butylpyrazolyl)borate]nickel methyl, [hydrotris(3,5-di-tert-butylpyrazolyl)borate]nickel ethyl, [hydrotris(3,5-di-tert-butylpyrazolyl)borate]nickel allyl, [hydrotris(3,5-di-tert-butylpyrazolyl)borate]nickel methallyl, and compounds indicated by the structural formula described below, etc.

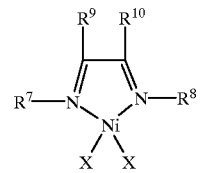

(wherein each of $R^7$ and $R^8$ is a 2,6-diisopropylphenyl group, and X, $R^9$ and $R^{10}$ are any one of the combination of the substituents represented in Table 1 described below.)

TABLE 1

| | | |
|---|---|---|
| R⁹ = R¹⁰ = hydrogen atom<br>X = fluorine atom | R⁹ = R¹⁰ = methyl group<br>X = fluorine atom | Acenaphthyl group by R⁹ & R¹⁰<br>X = fluorine atom |
| R⁹ = R¹⁰ = hydrogen atom<br>X = chlorine atom | R⁹ = R¹⁰ = methyl group<br>X = chlorine atom | Acenaphthyl group by R⁹ & R¹⁰<br>X = chlorine atom |
| R⁹ = R¹⁰ = hydrogen atom<br>X = iodine atom | R⁹ = R¹⁰ = methyl group<br>X = iodine atom | Acenaphthyl group by R⁹ & R¹⁰<br>X = iodine atom |
| R⁹ = R¹⁰ = hydrogen atom<br>X = methyl group | R⁹ = R¹⁰ = methyl group<br>X = methyl group | Acenaphthyl group by R⁹ & R¹⁰<br>X = methyl group |
| R⁹ = R¹⁰ = hydrogen atom<br>X = ethyl group | R⁹ = R¹⁰ = methyl group<br>X = ethyl group | Acenaphthyl group by R⁹ & R¹⁰<br>X = ethyl group |
| R⁹ = R¹⁰ = hydrogen atom<br>X = n-propyl group | R⁹ = R¹⁰ = methyl group<br>X = n-propyl group | Acenaphthyl group by R⁹ & R¹⁰<br>X = n-propyl group |
| R⁹ = R¹⁰ = hydrogen atom<br>X = isopropyl group | R⁹ = R¹⁰ = methyl group<br>X = isopropyl group | Acenaphthyl group by R⁹ & R¹⁰<br>X = isopropyl group |
| R⁹ = R¹⁰ = hydrogen atom<br>X = n-butyl group | R⁹ = R¹⁰ = methyl group<br>X = n-butyl group | Acenaphthyl group by R⁹ & R¹⁰<br>X = n-butyl group |
| R⁹ = R¹⁰ = hydrogen atom<br>X = phenyl group | R⁹ = R¹⁰ = methyl group<br>X = phenyl group | Acenaphthyl group by R⁹ & R¹⁰<br>X = phenyl group |
| R⁹ = R¹⁰ = hydrogen atom<br>X = benzyl group | R⁹ = R¹⁰ = methyl group<br>X = benzyl group | Acenaphthyl group by R⁹ & R¹⁰<br>X = benzyl group |

Further, compounds in which nickel of these compound is replaced with palladium, cobalt, rhodium or ruthenium can be similarly exemplified in the above-mentioned nickel compounds.

Among the metal compounds represented by the general formula [4], specific examples of compounds in which the metal atom is iron include 2,6-bis-[1-(2,6-dimethylphenylimino)ethyl]pyridineiron dichloride, 2,6-bis-[1-(2,6-diisopropylphenylimino) ethyl]pyridineiron dichloride, 2,6-bis-[1-(2-tert-butylphenylimino)ethyl] pyridineiron dichloride, [hydrotris(3,5-dimethylpyrazolyl) borate]iron chloride, [hydrotris(3,5-dimethylpyrazolyl) borate]iron bromide, [hydrotris(3,5-dimethylpyrazolyl) borate]iron iodide, [hydrotris(3,5-dimethylpyrazolyl)borate] iron methyl, [hydrotris(3,5-dimethylpyrazolyl)borate]iron ethyl, [hydrotris(3,5-dimethylpyrazolyl)borate]iron allyl, [hydrotris(3,5-dimethylpyrazolyl)borate]iron methallyl, [hydrotris(3,5-diethylpyrazolyl)borate]iron chloride, [hydrotris(3,5-diethylpyrazolyl)borate]iron bromide, [hydrotris(3,5-diethylpyrazolyl)borate]iron iodide, [hydrotris(3,5-diethylpyrazolyl)borate]iron methyl, [hydrotris(3,5-diethylpyrazolyl)borate]iron ethyl, [hydrotris (3,5-diethylpyrazolyl)borate]iron allyl, [hydrotris(3,5-diethylpyrazolyl)borate]iron methallyl, [hydrotris(3,5-di-tert-butylpyrazolyl)borate]iron chloride, [hydrotris(3,5-di-tert-butylpyrazolyl)borate]iron bromide, [hydrotris(3,5-di-tert-butylpyrazolyl)borate]iron iodide, [hydrotris(3,5-di-tert-butylpyrazolyl)borate]iron methyl, [hydrotris(3,5-di-tert-butylpyrazolyl)borate]iron ethyl, [hydrotris(3,5-di-tert-butylpyrazolyl)borate]iron allyl, [hydrotris(3,5-di-tert-butylpyrazolyl)borate]iron methallyl, and the like.

Moreover, compounds in which iron of these compounds is replaced with cobalt or nickel can be similarly exemplified.

Furthermore, specific examples of μ-oxo type compounds among the metal compounds represented by the general formula [4] include μ-oxobis[isopropylidene (cyclopentadienyl)(2-phenoxy)titanium chloride], μ-oxobis [isopropylidene(cyclopentadienyl)(2-phenoxy)titanium methoxide], μ-oxobis[isopropylidene(cyclopentadienyl)(3-tert-butyl-5-methyl-2-phenoxy)titanium chloride], μ-oxobis[isopropylidene(cyclopentadienyl)(3-tert-butyl-5-methyl-2-phenoxy)titanium methoxide], μ-oxobis [isopropylidene(methylcyclopentadienyl)(2-phenoxy) titanium chloride], μ-oxobis[isopropylidene (methylcyclopentadienyl)(2-phenoxy)titanium methoxide], μ-oxobis[isopropylidene(methylcyclopentadienyl)(3tert-butyl-5-methyl-2-phenoxy)titanium chloride], μ-oxobis [isopropylidene(methylcyclopentadienyl)(3-tert-butyl-5-methyl-2-phenoxy)titanium methoxide], μ-oxobis [isopropylidene(tetramethylcyclopentadienyl)(2-phenoxy) titanium chloride], μ-oxobis[isopropylidene (tetramethylcyclopentadienyl)(2-phenoxy)titanium methoxide], μ-oxobis[isopropylidene (tetramethylcyclopentadienyl)(3-tert-butyl-5-methyl-2-phenoxy)titanium chloride], μ-oxobis[isopropylidene (tetramethylcyclopentadienyl)(3-tert-butyl-5-methyl-2-phenoxy)titanium methoxide], μ-oxobis[dimethylsilylene (cyclopentadienyl)(2-phenoxy)titanium chloride], μ-oxobis [dimethylsilylene(cyclopentadienyl)(2-phenoxy)titanium methoxide], μ-oxobis[dimethylsilylene(cyclopentadienyl) (3-tert-butyl-5-methyl-2-phenoxy)titanium chloride], μ-oxobis[dimethylsilylene(cyclopentadienyl)(3-tert-butyl-5-methyl-2-phenoxy)titanium methoxide], μ-oxobis [dimethylsilylene(methylcyclopentadienyl)(2-phenoxy) titanium chloride], μ-oxobis[dimethylsilylene (methylcyclopentadienyl)(2-phenoxy)titanium methoxide], μ-oxobis[dimethylsilylene(methylcyclopentadienyl)(3-tert-butyl-5-methyl-2-phenoxy)titanium chloride], μ-oxobis [dimethylsilylene(methylcyclopentadienyl)(3-tert-butyl-5-methyl-2-phenoxy)titanium methoxide], μ-oxobis [dimethylsilylene(tetramethylcyclopentadienyl)(2-phenoxy) titanium chloride], μ-oxobis[dimethylsilylene (tetramethylcyclopentadienyl)(2-phenoxy)titanium methoxide], μ-oxobis[dimethylsilylene (tetramethylcyclopentadienyl)(3-tert-butyl-5-methyl-2-phenoxy)titanium chloride], μ-oxobis[dimethylsilylene (tetramethylcyclopentadienyl)(3-tert-butyl-5-methyl-2-phenoxy)titanium methoxide], μ-oxobis[isopropylidene (cyclopentadienyl)(2-phenoxy)titanium], di-μ-oxobis [isopropylidene(cyclopentadienyl)(3-tert-butyl-5-methyl-2-phenoxy)titanium], di-μ-oxobis[isopropylidene (methylcyclopentadienyl)(2-phenoxy)titanium], di-μ-oxobis [isopropylidene(methylcyclopentadienyl)(3-tert-butyl-5-methyl-2-phenoxy)titanium], di-μ-oxobis[isopropylidene (tetramethylcyclopentadienyl)(2-phenoxy)titanium], di-μ-oxobis[isopropylidene(tetramethylcyclopentadienyl)(3-tert-butyl-5-methyl-2-phenoxy)titanium], di-μ-oxobis [dimethylsilylene(cyclopentadienyl)(2-phenoxy)titanium], di-μ-oxobis[dimethylsilylene(cyclopentadienyl)(3-tert-butyl-5-methyl-2-phenoxy)titanium], di-μ-oxobis [dimethylsilylene(methylcyclopentadienyl)(2-phenoxy) titanium], di-μ-oxobis[dimethylsilylene (methylcyclopentadienyl)(3-tert-butyl-5-methyl-2- phenoxy)titanium], di-μ-oxobis[dimethylsilylene (tetramethylcyclopentadienyl)(2-phenoxy)titanium], di-μ-oxobis[dimethylsilylene(tetramethylcyclopentadienyl)(3-tert-butyl-5-methyl-2-phenoxy)titanium] and the like.

In addition to the metal compounds represented by the general formula [4] and the μ-oxo type metal compounds which were exemplified above, specific examples of compounds in which the metal atom is nickel in the metal compound (B) include nickel chloride, nickel bromide, nickel iodide, nickel sulfate, nickel nitrate, nickel perchlorate, nickel acetate, nickel acetylacetonate, bis(allyl) nickel, bis(1,5-cyclooctadiene)nickel, dichloro(1,5-cyclooctadiene)nickel, dichlorobis(acetonitrile)nickel, dichlorobis(benzonitrile)nickel, carbonyltris (triphenylphosphine)nickel, dichlorobis(triethylphosphine) nickel, diacetobis(triphenylphosphine)nickel, tetrakis (triphenylphosphine)nickel, dichloro[1,2-bis (diphenylphosphino)ethane]nickel, bis[1,2-bis (diphenylphosphino)ethane]nickel, dichloro[1,3-bis (diphenylphosphino)propane]nickel, bis[1,3-bis (diphenylphosphino)propane]nickel, tetraaminenickel nitrate, tetrakis(acetonitrile)nickel tetrafluoroborate, nickel phthalocyanine and the like.

Similarly, specific examples of compounds in which the metal atom is a vanadium atom include vanadium acetylacetonate, vanadium tetrachloride, vanadium oxy trichloride and the like.

Further, specific examples of a compound in which a metal atom is a samarium atom include bis (pentamethylcyclopentadienyl)samarium methyltetrahydrofuran and the like.

Specific examples of a compound in which a metal atom is an ytterbium atom include bis (pentamethylcyclopentadienyl)ytterbium methyltetrahydrofuran and the like.

As the compound in which the metal atom is an aluminum atom, a compound represented by the general formula described below is mentioned:

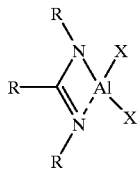

(wherein each of R's represents a hydrogen atom, a halogen atom, and a hydrocarbon group, they may be mutually the same or different, 2 or more of these may be mutually bonded, and may form a ring. X represents a hydrogen atom, a halogen atom, and a hydrocarbon group, two X's may be mutually the same or different, may be mutually bonded, and may form a ring.)

These metal compounds (B) may be used alone or in combination of 2 or more. Among the metal compounds exemplified above, the metal compound (B) used in the present invention is preferably a metal compound represented by the above-mentioned general formula [4].

Especially, a metal compound in which M is a transition metal atom in the general formula [4] is preferable, and in particular, a metal compound having at least one group having cyclopentadienyl type anion skeleton as L in the general formula [4] is preferable.

(C) Organoaluminum Compound

As the organoaluminum compound of the component (C) used in the catalyst for addition polymerization of the present invention, known organoaluminum compound can be used. An organoaluminum compound represented by the general formula [7] described below is preferable.

$$R^4_b AlY_{3-b} \quad [7]$$

(wherein $R^4$ represents a hydrocarbon group, and all of $R^4$'s may be the same or different. Y represents a hydrogen atom, a halogen atom, an alkoxy group, an aralkyloxy group, or an aryloxy group, and b represents a number satisfying $0<b\leq 3$.)

As $R^4$ in the general formula [7], a hydrocarbon group having 1 to 24 carbon atoms is preferable and an alkyl group having 1 to 24 carbon atoms is more preferable. Specific examples thereof include a methyl group, an ethyl group, a n-propyl group, a n-butyl group, an isobutyl group, a n-hexyl group, a 2-methylhexyl group, a n-octyl group and the like, and an ethyl group, a n-butyl group, an isobutyl group or n-hexyl group is preferable.

Further, when Y is a halogen atom, specific examples thereof include a fluorine atom, a chlorine atom, a bromine atom, and an iodine atom, and a chlorine atom is preferable.

As the alkoxy group in Y, an alkoxy group having 1 to 24 carbon atoms is preferable, and specific examples thereof include a methoxy group, an ethoxy group, a n-propoxy group, an isopropoxy group, a n-butoxy group, a sec-butoxy group, a tert-butoxy group, a n-pentoxy group, a neopentoxy group, a n-hexoxy group, a n-octoxy group, a n-dodecoxy group, a n-pentadecoxy group, a n-eicosoxy group and the like, and a methoxy group, an ethoxy group or a tert-butoxy group is preferable.

All of these alkoxy groups may be substituted with a halogen atom such as a fluorine atom, a chlorine atom, a bromine atom or an iodine atom, an alkoxy group such as a methoxy group, an ethoxy group or the like, an aryloxy group such as a phenoxy group or the like, etc.

As the aryloxy group in Y, an aryloxy group having 6 to 24 carbon atoms is preferable, and specific examples thereof include a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 3,4,5-trimethylphenoxy group, a 2,3,4,5-tetramethylphenoxy group, a 2,3,4,6-tetramethylphenoxy group, a 2,3,5,6-tetramethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphthoxy group, an anthracenoxy group and the like.

All of these aryloxy groups may be substituted with a halogen atom such as a fluorine atom, a chlorine atom, a bromine atom or an iodine atom, an alkoxy group such as a methoxy group, an ethoxy group or the like, an aryloxy group such as a phenoxy group or the like, etc.

As the aralkyloxy group in Y, an aralkyloxy group having 7 to 24 carbon atoms is preferable, and specific examples thereof include a benzyloxy group, a (2-methylphenyl) methoxy group, a (3-methylphenyl)methoxy group, a (4-methylphenyl)methoxy group, a (2,3-dimethylphenyl) methoxy group, a (2,4-dimethylphenyl)methoxy group, a (2,5-dimethylphenyl)methoxy group, a (2,6- dimethylphenyl)methoxy group, a (3,4-dimethylphenyl) methoxy group, a (3,5-dimethylphenyl)methoxy group, a (2,3,4-trimethylphenyl)methoxy group, a (2,3,5-trimethylphenyl)methoxy group, a (2,3,6-trimethylphenyl) methoxy group, a (2,4,5-trimethylphenyl)methoxy group, a (2,4,6-trimethylphenyl)methoxy group, a (3,4,5-tetramethylphenyl)methoxy group, a (2,3,4,5,-tetramethylphenyl)methoxy group, a (2,3,5, 6tetramethylphenyl)methoxy group a (pentamethylphenyl) methoxy group, an (ethylphenyl)methoxy group, a (n-propylphenyl)methoxy group, an (isopropylphenyl) methoxy group, (n-butylphenyl)methoxy group, a (sec-butylphenyl)methoxy group, a (tert-butylphenyl)methoxy group, a (n-hexylphenyl)methoxy group, a (n-octylphenyl) methoxy group, a (n-decylphenyl)methoxy group, a (n-tetradecylphenyl)methoxy group, a naphthylmethoxy group, an anthracenylmethoxy group and the like, and a benzyloxy group is preferable.

All of these aralkyloxy groups may be substituted with a halogen atom such as a fluorine atom, a chlorine atom, a bromine atom or an iodine atom, an alkoxy group such as a methoxy group, an ethoxy group or the like, an aryloxy group such as a phenoxy group or the like, etc.

Specific examples of the organoaluminum compound represented by the general formula [7] include trialkylaluminums such as trimethylaluminum, triethylaluminum, tri-n-propylaluminum, tri-n-butylaluminum, triisobutylaluminum, tri-n-hexylaluminum, tri-n-octylaluminum, and the like; dialkylaluminum chlorides such as dimethylaluminum chloride, diethylaluminum chloride, di-n-propylaluminum chloride, di-n-butylaluminum chloride, diisobutylaluminum chloride, di-n-hexylaluminum chloride and the like; alkylaluminum dichlorides such as methylaluminum dichloride, ethylaluminum dichloride, n-propylaluminum dichloride, n-butylaluminum dichloride, isobutylaluminum dichloride, n-hexylaluminum dichloride and the like; and dialkylaluminum hydrides such as dimethylaluminum hydride, diethylaluminum hydride, di-n-propylaluminum hydride, di-n-butylaluminum hydride, diisobutylaluminumhydride, di-n-hexylaluminumhydride and the like; alkyl(dialkoxy) aluminums such as methyl(dimethoxy)aluminum, methyl (diethoxy)aluminum, methyl(di-tert-butoxy)aluminum and the like; dialkyl(alkoxy)aluminums such as dimethyl (methoxy)aluminum, dimethyl(ethoxy)aluminum, dimethyl (tert-butoxy)aluminum and the like; alkyl(diaryloxy) aluminums such as methyl(diphenoxy)aluminum, methylbis (2,6-diisopropylphenoxy)aluminum, mehtylbis(2,6-diphenylphenoxy)aluminum and the like; dialkyl(aryloxy) aluminums such as dimethyl(phenoxy) aluminum, dimethyl (2,6-diisopropylphenoxy)aluminum, dimehtyl(2,6-diphenylphenoxy)aluminum and the like, etc.

Among these, a trialkylaluminum is preferable, trimethylaluminum, triethylaluminum, tri-n-butylaluminum, triisobutylaluminum or tri-n-hexylaluminum is more preferable, and in particular, triisobutylaluminum or tri-n-hexylaluminum is preferable.

These organoaluminum compounds may be used alone or in combination of 2 or more.

The molar ratio of the amount used of the respective catalyst components in the present invention is not particularly limited, and the molar ratio of the component (A) to the component (B)[(A):(B)] is usually from 1:1 to 10000:1, preferably from 1:1 to 5000:1, and more preferably 1:1 to 1000:1. In case of using the component (C), the molar ratio of the compound (B) to compound (C) [(B):(C)] is usually from 0.1:1 to 1:10000, and preferably from 1:1 to 1:1000.

As the catalyst for addition polymerization of the present invention, a product obtained by preliminarily contacting the component (A) and the component (B), optionally, further the component (C) may be used, and they may be used by being separately charged in a polymerization reaction apparatus. The arbitrary two components among them may be preliminarily contacted, and further, the remainder component may be contacted.

When the respective components are used as a solution, the concentration of the component (A) and the component (C) are usually 0.0001 to 100 mmol/L converted to metal atom, and preferably 0.01 to 10 mmol/L, respectively. The concentration of the component (B) is usually 0.0001 to 100 mmol/L converted to metal atom, and preferably 0.01 to 10 mmol/L.

The method of feeding the respective components in a reactor is not particularly limited. A method of feeding the respective components in a solid state, a method of feeding them in a state of a solution, suspension or slurry in which they are respectively solved, suspended, or slurred in a hydrocarbon solvent from which components such as moisture, oxygen and the like deactivating a catalyst component are removed, and the like are mentioned.

The polymerization method should not be specifically limited. For example, there are mentioned a solvent polymerization or slurry polymerization in which an aliphatic hydrocarbon such as butane, pentane, hexane, heptane, octane or the like; an aromatic hydrocarbon such as benzene, toluene or the like; or a halogenated hydrocarbon such as methylene dichloride or the like is used as a solvent, a bulk polymerization in which polymerization is carried out in a liquid monomer, a gas phase polymerization in which polymerization is carried out in a gaseous monomer, a high-pressure polymerization method in which polymerization is carried out under a supercritical liquid condition of a high temperature and a high pressure, etc. As polymerization form, either of a batch-wise type and a continuous type are possible.

The polymerization temperature is usually from −100° C. to 350° C., preferably from −20° C. to 300° C., and more preferably from 20° C. to 300° C. The polymerization pressure is usually from 1 to 3500 kg/cm$^2$G, preferably from 1 to 3000 kg/cm$^2$G, and more preferably from 1 to 2000 kg/cm$^2$G. In general, the polymerization time is appropriately determined depending on a desired polymer and a reaction apparatus, and is usually 1 minute to 20 hours can be adopted.

As monomers which can be used, either of olefins having 2 to 100 carbon atoms, diolefins, alkenylaromatic hydrocarbons and polar monomers can be used, and two or more monomers can also be used, simultaneously. Specific examples of thereof include olefins such as ethylene, propylene, 1-butene, 1-pentene, 4-methyl-1-pentene, 5-methyl-1-hexene, 1-hexene, 1-heptene, 1-ctene, 1-nonene, 1-decene, vinylcyclohexane and the like; diolefins such as 1,5-hexadiene, 1,4-hexadiene, 1,4-pentadiene, 1,7-octadiene, 1,8-nonadiene, 1,9-decadiene, 4-methyl-1,4-hexadiene, 5-methyl-1,4-hexadiene, 7-methyl-1,6-octadiene, 5-ethylidene-2-norbornene, dicyclopentadiene, 5-vinyl-2-norbornene, 5-methyl-2-norbornene, 1,5-cyclooctadiene, 5,8-endomethylenehexahydronaphthalene, 1,3-butadiene, isoprene, 1,3-hexadiene, 1,3-octadiene, 1,3-cyclooctadiene, 1,3-cyclohexadiene and the like; cyclicolefins such as norbornene, 5-methylnorbornene, 5-ethylnorbornene, 5-butylnorbornene, 5-phenylnorbornene, 5-benzylnorbornene, tetracyclododecene, tricyclodecene, tricycloundecene, pentacyclopentadecene, pentacyclohexadecene, 8-methyltetracyclododecene, 8-ethyltetracyclododecene, 5-acetylnorbornene, 5-acetyloxynorbornene, 5-methoxycarbonylnorbornene, 5-ethoxycarbonylnorbornene, 5-methyl-5-methoxycarbonylnorbornene, 5-cyanonorbornene, 8-methoxycarbonyltetracyclododecene, 8-methyl-8-tetracyclododecene, 8-cyanotetracyclododecene and the like; alkenylbenzenes such as styrene, 2-phenylpropylene, 3-phenylpropylene and the like; alkylstyrenes such as p-methylstyrene, m-methylstyrene, o-methylstyrene, p-ethylstyrene, m-ethylstyrene, o-ethylstyrene, 2,4-dimethylstyrene, 2,5-dimethylstyrene, 3,4-dimethylstyrene, 3,5-dimethylstyrene, s3-methyl-5-ethylstyrene, p-tert-butylstyrene, p-sec-butylstyrene and the like; bis(alkenyl) benzenes such as divinylbenzene and the like; alkenylaromatic hydrocarbons such as alkenylnaphthalenes and the like such as 1-vinylnaphthalene and the like; polar monomers such as α, β-unsaturated carboxylic acids such as acrylic acid, methacrylic acid, fumaric acid, maleic anhydride, itaconic acid, itaconic anhydride, bicyclo(2,2,1)-5-heptene-2,3-dicarboxylic acid and the like, and metal salts thereof such as sodium, potassium, lithium, calcium and the like; α, β-unsaturated carboxylic acid esters such as methyl acrylate, ethyl acrylate, n-propyl acrylate, isopropyl acrylate, tert-butyl acrylate, 2-ethylhexyl acrylate, methyl methacrylate, ethyl methacrylate, n-propyl methacrylate, isopropyl methacrylate, n-butyl methacrylate, isobutyl methacrylate and the like; unsaturated dicarboxylic acids such as maleic acid, itaconic acid and the like; vinyl esters such as vinyl acetate, vinyl propionate, vinyl capronate, vinyl caprate, vinyl laurate, vinyl stearate, vinyl trifluoroacetate and the like; β-unsaturated carboxylic acid glycidyl such as acrylic acid glycidylate, methacrylic acid glycidylate, itaconic acid glycidylate and the like; etc.

The present invention can be applied to homopolymerization or copolymerization of these monomers. Specific examples of the monomer constituting the copolymer include ethylene-propylene, ethylene-1-butene, ethylene-1-hexene, propylene-1-butene and the like, but the present invention should not be limited to these.

In order to control the molecular weight of a polymer, a chain transfer agent such as hydrogen or the like can be added.

The catalyst for addition polymerization of the present invention is particularly suitable as a catalyst for olefin polymerization. The olefin polymer is preferably a copolymer of ethylene with an α-olefin, particularly an α-olefin having 3 to 20 carbon atoms, and specifically, a linear low density polyethylene (LLDPE) is preferable.

The present invention is further illustrated in detail according to Examples and Comparative Examples below, but the present invention is not limited thereto.

The measurement values of respective items in Examples were measured according to methods described below.

(1) The content of α-olefin unit in a copolymer was determined from the characteristic absorption of ethylene and α-olefin using an infrared spectrometer (FT-IR7300, manufactured by NIPPON BUNKO Inc.) and was represented as a short-chain branch (SCB) number per 1000 carbon atoms.

(2) Intrinsic viscosity ([η]):
It was measured at 135° C. in a tetralin solution using an Ubbelohde viscometer.

(3) Molecular weight and molecular weight distribution:
They were determined under the under-mentioned conditions according to a gel permeation chromatography (GPC). Calibration curve was prepared using a standard polystyrene. Molecular weight distribution was evaluated by a ratio (Mw/Mn) of weight average molecular weight (Mw) to number average molecular weight (Mn).
Equipment: 150C type, manufactured by Milipore Waters Co., Ltd.
Column: TSK-GEL GMH-HT; 7.5×600×2 columns
Measurement temperature: 140° C.
Solvent: O-dichlorobenzene
Measurement concentration: 5 mg/5 ml

EXAMPLE 1

After drying under vacuum an autoclave having an inner volume of 400 ml equipped with a stirrer and replacing with argon, 190 ml of hexane as a solvent and 10 ml of 1-hexene as a comonomer were charged and the autoclave was heated to 70° C. After the heating, ethylene was fed while adjusting at an ethylene pressure of 6 kg/cm². After the system was stabilized, 0.25 mmol of triisobutylaluminum was charged, successively, 1.0 μmol of ethylenebis(indenyl)zirconium dichioride was charged, further, 86.5 mg (101 μmol) of the complex A having the under-mentioned structure was charged, and polymerization was started. The polymerization was carried out for 30 minutes.

As a result of the polymerization, 18.6 g of an ethylene-1-hexene copolymer was obtained. Polymerization activity was $3.7 \times 10^7$ g/mol/h., SCB was 19.37, [η] was 1.29 dl/g, Mw was 88000, and Mw/Mn was 2.6.

Complex A:

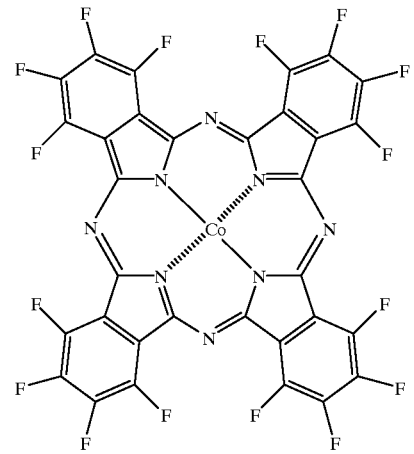

manufactured by Aldrich Co., Ltd.
The orbital coefficient of the valence p-type atomic orbital was 0.879, and the orbital energy was 0.0035.

The calculation was carried out as follows: A calculation method called as B3LYP of the calculation of density functional method was used for the complex A, the complex B and $Zn(OC_6F_5)_2$, and the combinations of base functions called as 3-21G which is stored in a program were used for the atomic orbitals of the respective atoms. The result of Table 1 was obtained by calculating them according to the density functional method using a planar structure calculated by molecular dynamics calculation.

EXAMPLE 2

After drying under vacuum an autoclave having an inner volume of 400 ml equipped with a stirrer and replacing with argon, 190 ml of hexane as a solvent and 10 mi of hexene-1 as a comonomer were charged and the reactor was heated to 70° C. After the heating, ethylene was fed while adjusting at an ethylene pressure of 6 kg/cm². After the inside of system was stabilized, 0.25 mmol of triisobutylaluminum was charged, and successively, 77.1 mg (89.7 μmol) of the complex A used in Example 1 was charged. After stirring for 30 minutes, 1.0 μmol of ethylenebis(indenyl)zirconium dichloride was charged, and polymerization was carried out for 30 minutes.

As a result of the polymerization, 20.79 g of an ethylene-1-hexene copolymer was obtained. Polymerization activity was $4.2 \times 10^7$ g/mol/h.

EXAMPLE 3

Polymerization was carried out in the same manner as in Example 1 except that 84.6 mg (97.7 μmol) of the complex B having the under-mentioned structure in place of the complex A in Example 1 was used.

As a result, 2.46 g of an ethylene-hexene-1 copolymer was obtained. Polymerization activity was $4.9 \times 10^6$ g/mol/h., [η] was 1.28 dl/g, Mw was 73000, and Mw/Mn was 1.9.

Complex B:

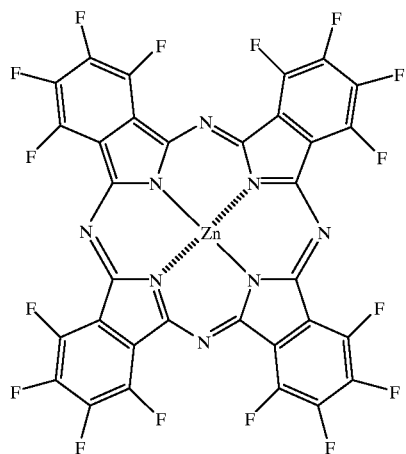

manufactured by Aldrich Co., Ltd.

The orbital coefficient of valence p-type atomic orbital was 0.773, and the orbital energy was 0.0049. The calculation was carried out in the same manner as in the complex A as above.

Comparative Example 1

Polymerization was carried out in the same manner as in Example 1 except that the polymerization was carried out by using 75.2 mg (87.5 μmol) of the complex A and not using ethylenebis(indenyl)zirconium dichloride, in Example 1. As a result, the formation of a polymer could not be confirmed.

Comparative Example 2

Example 3 was repeated except that Complex C in which Zn metal atom of the complex B was replaced with Cu atom was used.

As a result of the polymerization, only trace amount of a polymer was obtained.

Complex C: the orbital coefficient of valence p-type atomic orbital was 0.852, and the orbital energy was 0.0093. The calculation was carried out in the same manner as in the complex A as above.

As described above in detail, according to the present invention, a catalyst component for addition polymerization providing a catalyst for addition polymerization revealing a high polymerization activity and a catalyst for addition polymerization and an efficient process for producing an addition polymer using the catalyst for addition polymerization are provided.

What is claimed is:

1. A catalyst for addition polymerization obtained by contacting:
   (A) a compound selected from the group consisting of compounds represented by the formulas (A1), (A2) and (A3):

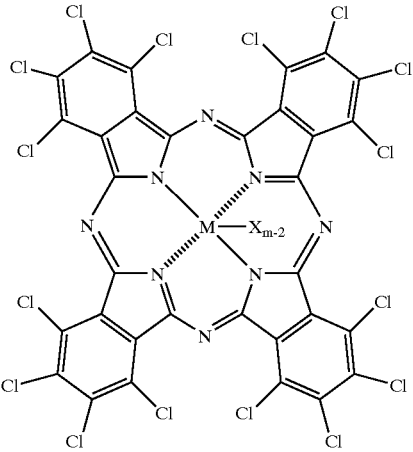

(A1)

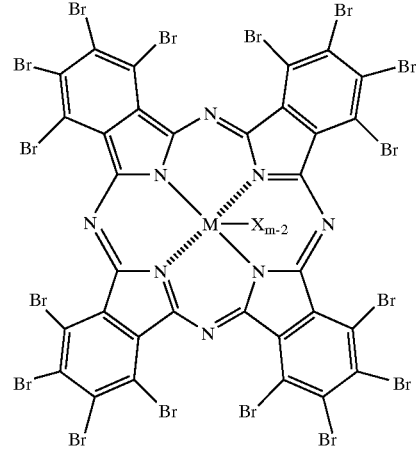

(A2)

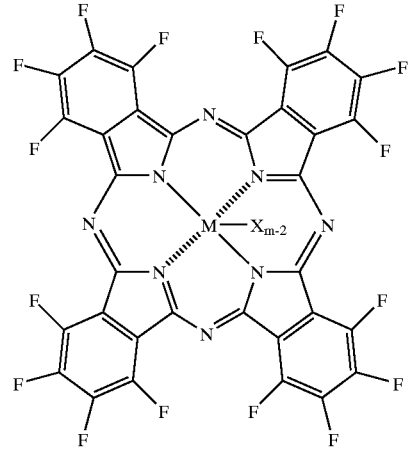

(A3)

wherein M represents an atom of the Group II to the Group XII (with the proviso that Cu is excluded in (A3)) or Lanthanide series of the Periodic Table; X represents a hydrogen atom, a halogen atom, a hydrocarbon group or a hydrocarbon oxy group, and when a plural number of X's exist, they may be mutually the same or different; m represents a valence of M, wherein the M in which the lowest orbital level energy level of vacant unoccupied molecular orbital having the valence p-atomic p-type atomic orbital of valence electron orbital of the M as a main component wherein the coefficient represented by a linear bonding linear combination is 0.4 or more is calculated to be 0.008 atomic unit (Hartree) or less by the calculation of density functional method (B3LYP/3-21G level); with (B) a metal compound (B) selected from the group consisting of compounds represented by $L_a M^1 X_b$ and $\mu$-oxo type compounds thereof, wherein $M^1$ is a metal atom of the Group III to the Group XIII or Lanthanide series; L is a group having cyclopentadienyl type anion skeleton or a group containing a hetero atom; a plurality of L's may be linked directly, or through a residual group containing a carbon atom, a silicon atom, a nitrogen atom, an oxygen atom, a sulfur atom or a phosphorous atom; X is a halogen atom or a hydrocarbon group; "a" represents a number satisfying $0<a\leq 8$; and "b" represents a number satisfying $0<b\leq 8$.

2. A catalyst for addition polymerization obtained by contacting:

(A) a compound selected from the group consisting of compounds represented by the formulas (A1), (A2) and (A3):

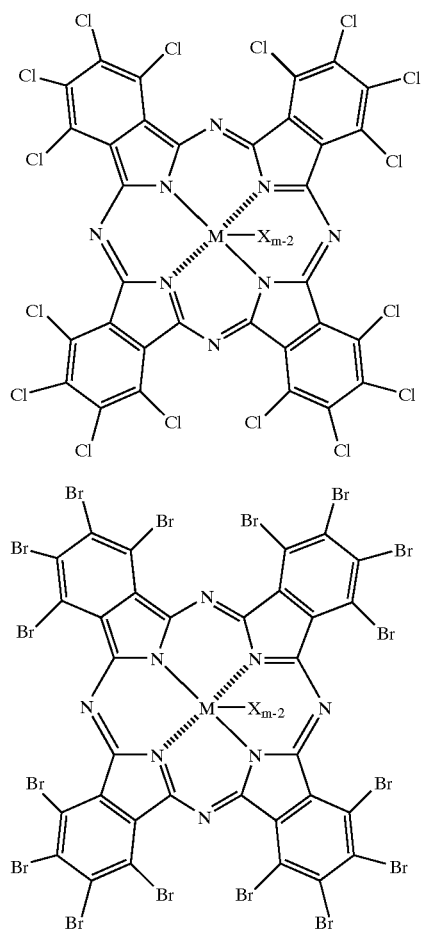

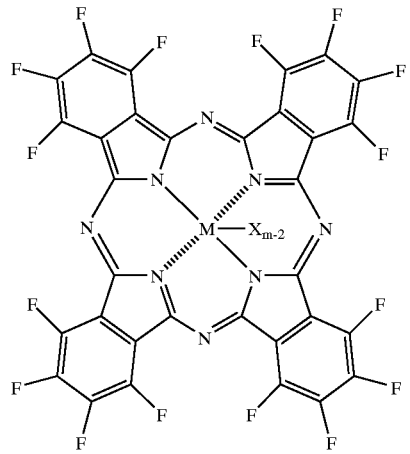

wherein M represents an atom of the Group II to the Group XII (with the proviso that Cu is excluded in (A3)) or Lanthanide series of the Periodic Table; X represents a hydrogen atom, a halogen atom, a hydrocarbon group or a hydrocarbon oxy group, and when a plural number of X's exist, they may be mutually the same or different; m represents a valence of M, wherein the M in which the lowest orbital level energy level of vacant unoccupied molecular orbital having the valence p-atomic p-type atomic orbital of valence electron orbital of the M as a main component wherein the coefficient represented by a linear bonding linear combination is 0.4 or more is calculated to be 0.008 atomic unit (Hartree) or less by the calculation of density functional method (B3LYP/3-21G level); with (B) a metal compound (B) selected from the group consisting of compounds represented by $L_a M^1 X_b$ and $\mu$-oxo type compounds thereof, wherein $M^1$ is a metal atom of the Group III to the Group XIII or Lanthanide series; L is a group having cyclopentadienyl type anion skeleton or a group containing a hetero atom; a plurality of L's may be linked directly, or through a residual group containing a carbon atom, a silicon atom, a nitrogen atom, an oxygen atom, a sulfur atom or a phosphorous atom; X is a halogen atom or a hydrocarbon group; "a" represents a number satisfying $0<a\leq 8$; and "b" represents a number satisfying $0<a\leq 8$, and (C) an organoaluminum compound.

3. The catalyst component according to claim 1, wherein M is an atom of the Group IX or the Group XII.

4. The catalyst component according to claim 2, wherein M is an atom of the Group IX or the Group XII.

5. The catalyst according to claim 1, wherein the compound (B) is a metallocene compound.

6. The catalyst according to claim 2, wherein the compound (B) is a metallocene compound.

7. The catalyst according to claim 1, wherein the compound (A) is a compound represented by the general formula (A3).

8. The catalyst according to claim 2, wherein the compound (A) is a compound represented by the general formula (A3).

9. The catalyst according to claim 7, wherein M is an atom of the Group IX or Group XII.

10. The catalyst according to claim 8, wherein M is an atom of the Group IX or Group XII.

11. A process for producing an addition polymer, which comprises polymerizing an addition polymerizable monomer in the presence of the catalyst of claim 1.

12. A process for producing an addition polymer, which comprises polymerizing an addition polymerizable monomer in the presence of the catalyst of claim 2.

13. The process according to claim 11, wherein the addition polymerizable polymer is an olefin.

14. The process according to claim 12, wherein the addition polymerizable polymer is an olefin.

15. The process according to claim 13, wherein the olefin is a mixture of ethylene and α-olefin.

16. The process according to claim 14, wherein the olefin is a mixture of ethylene and α-olefin.

17. A process for producing an addition polymer, which comprises polymerizing an addition polymerizable monomer in the presence of the catalyst of claim 5.

18. A process for producing an addition polymer, which comprises polymerizing an addition polymerizable monomer in the presence of the catalyst of claim 6.

* * * * *